United States Patent
Buda et al.

(10) Patent No.: US 6,611,724 B1
(45) Date of Patent: Aug. 26, 2003

(54) ON LINE MONITOR FOR A CONTROL DEVICE

(75) Inventors: Paul Robert Buda, Raleigh, NC (US); Larry Alan Dew, Durham, NC (US); Todd Charles Wheaton, Clayton, NC (US); Jackie Laverne Winn, Raleigh, NC (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/448,639

(22) Filed: Nov. 24, 1999

(51) Int. Cl.[7] .............................................. G05B 13/02
(52) U.S. Cl. .............................. 700/49; 706/45; 706/49
(58) Field of Search ................... 700/49, 104; 706/908, 706/909, 934; 346/14; 367/76

(56) References Cited

U.S. PATENT DOCUMENTS

| | | | |
|---|---|---|---|
| 5,386,360 A | * 1/1995 | Wilson et al. | 700/17 |
| 5,630,164 A | * 5/1997 | Williams et al. | 703/24 |
| 5,963,450 A | * 10/1999 | Dew | 700/169 |
| 5,982,274 A | * 11/1999 | Stelter et al. | 340/286.05 |
| 6,128,758 A | * 10/2000 | Hall et al. | 714/27 |
| 6,199,018 B1 | * 3/2001 | Quist et al. | 702/34 |
| 6,434,435 B1 | * 8/2002 | Tubel et al. | 700/30 |
| 6,505,141 B2 | * 1/2003 | Smith et al. | 702/166 |

* cited by examiner

Primary Examiner—Emanuel Todd Voeltz
Assistant Examiner—Crystal J. Barnes
(74) Attorney, Agent, or Firm—Michael J. Femal; Larry I. Golden

(57) ABSTRACT

An online monitor that can be permanently attached to a device to be monitored continuously monitors a set of analog signals and initiates data capture over a window of time when a user programmable set of conditions is satisfied. The online monitor includes a digital signal processing unit, a modular, interchangeable, analog signal conditioning base unit that can be tailored to the specific requirements of the process to be monitored and a modular, interchangeable, communication interface unit. The interface unit permits the digital signal processing unit to exchange data with external equipment such as network computers via a number of industry standard communication fieldbus protocols. The online monitor provides the capability to define the trigger condition under which data capture is initiated by comparing a user defined signal to a function of the instantaneous value of another signal or constant. Data captured is stored indefinitely in internally battery backed memory and the instant at which data capture is initiated is determined accurately via a time tagging function, so the data can be retrieved at a later time.

26 Claims, 24 Drawing Sheets

ON LINE MONITOR FOR A CONTROL DEVICE

TECHNICAL FIELD

Applicants' invention relates generally to the field of control systems and more particularly to an online monitor used to continuously check various data points in a control circuit and record the data when an event occurs.

BACKGROUND ART

Chart recorders and oscilloscopes have been available for many years for use as portable test equipment to examine analog, time varying signals over short intervals. Typically, these devices reside in a laboratory or when they are taken into the field, they are hand carried by an individual responsible for troubleshooting equipment, or to examine analog signals of interest. Rarely is such equipment left attached to a piece of equipment to be monitored in the field for long periods of time, for several reasons. Such equipment is typically expensive and often not suited for an industrial environment in which the electrical and ambient conditions are hostile. Conventional chart recorders and oscilloscopes are generally not designed to capture data for long periods of time. For instance, when a typical oscilloscope is triggered, the waveform(s) captured are stored visually on a cathode ray or other screen until such time as another event for which the oscilloscope has been commissioned to examine occurs, at which time the previous waveforms are erased. In the case of chart recorders, the capture and display of events typically takes the form of a paper representation of the analog waveforms captured, making such a device impractical to be left permanently attached to a remote location to be monitored. Someone occasionally must visit the site, change the paper, and retrieve the plots generated.

It would be beneficial in many applications to have an online monitoring device that is inexpensive, and capable of being permanently left in an application, capable of storing captured waveforms electronically and indefinitely. The waveforms could then be retrieved electronically via an industry standard communication network from a central location. As an example of such an application, consider the monitoring of control signals in the large circuit breakers used by electrical utilities in power distribution systems worldwide. A typical large utility in the United States may have thousands of such circuit breakers, each of which must be-periodically tested to determine their suitability for use when called upon to operate to control the flow of electricity in the power grid. Typically, technicians are employed on a permanent basis to travel to the respective locations of such circuit breakers to test the breakers as part of a normal maintenance schedule. To test a circuit breaker, the technician must manually re-route the current around the circuit breaker to be tested, then manually trip and reset the breaker with an oscilloscope or chart recorder attached to the appropriate test points of the circuit breaker control system. The technician then either interprets the data received immediately, or transports the information manually to another location for further interpretation.

In the normal operation of the power grid, circuit breakers are opened and reset in response to naturally occurring phenomena such as a detected overcurrent condition or overvoltage condition caused by a lightning strike. Many such circuit breakers are electrically connected to a local device such as a commercial programmable logic controller. As such, they can be set and reset remotely via commands sent via a communication network to the programmable logic device. If an inexpensive, permanent online monitor could be provided for each circuit breaker that could communicate it's information via a communication network to a central location, the process of travelling to the site and the steps taken to test the device could be eliminated. Furthermore, if the device were capable of capturing a plurality of signals representing the interesting features of the circuit breaker control circuits, and were capable of storing such waveforms indefinitely, the resulting device could also capture data from legitimate trips and resets of the breaker under normal operating conditions.

One of the difficulties in supplying such an on line monitoring device is that often a single utility company employs several different industry standard communication networks within its own grid. This phenomenon is common in many other industries as well. A single online monitor product that provides the capability to communicate with external equipment such as a network computer via a wide variety of industry standard networks would be advantageous from the standpoint of common programming, inventory management, and fewer individual components.

Another difficulty in applying prior art analog data gathering devices such as chart recorders and oscilloscopes for permanent installation is that the circuit breaker control circuits operate on several different nominal battery voltages with nominal voltages of 48 VDC, 125 VDC and 250 VDC common. In a conventional chart or data recorder or oscilloscope, the logical conditions that initiate the capture of data, henceforth referred to as events, must be custom programmed for each application, or at least for each voltage level. However, in this and many other applications, the appropriate level to initiate data capture is a function of the instantaneous value of another signal. In the circuit breaker application, the various levels at which one would want to begin capturing data are proportional to the voltage of the battery supplying the circuit breaker. An online monitor that provides the capability to define a trip point that is a function of the instantaneous value of another signal would eliminate the requirement to custom program each unit.

While the analog signal conditioning required to monitor circuit breakers is somewhat unique to that application, the basic functions of an online monitor are broadly applicable in industrial, commercial and other applications. For instance, in the circuit breaker-monitoring application, only voltages, some of which are proportional to currents flowing in the circuit breaker control circuitry are monitored. Other applications for such an online monitor are readily envisioned, such as a network of devices placed around the countryside used to monitor seismic activity. Such a device might monitor several axes of vibration or acceleration, temperature, barometric pressure and other parametric values. An online monitor that provides a modular analog signal conditioning unit would allow the basic online monitor concept to be broadly applicable.

Another feature of a monitoring device capable of being networked is an ability to accurately capture the time at which an event occurs, as defined by the internal programming of the monitoring device. This might be particularly important in applications where the propagation of phenomenon is of interest. For example, in the seismic activity monitoring application described above, the ability to accurately capture the time of an event with a high degree of both accuracy and resolution would be useful in determining the propagation of an energy wave generated by an earthquake.

It would be desirable to have an online monitoring device that substantially achieves these objectives, while retaining the intuitive aspects of the prior art.

SUMMARY OF THE INVENTION

Accordingly, the principal object of the present invention is to provide an inexpensive online monitor of analog signals that can be left permanently in an application, capable of capturing a user-definable plurality of analog signals upon satisfaction of a user defined trigger condition.

A further object of the present invention is to provide an online monitor that is capable of communicating with a number of different industry standard fieldbus communication standards by selecting an appropriate modular fieldbus communication module.

Yet a further object of the present invention is to provide a single online monitor that is capable of capturing many different types of analog signals by virtue of selecting an appropriate modular analog processing base suited to the user's application.

Still a further object of the present invention is to provide a single on-line monitor in which the end user can specify a number of different events, defined as the satisfaction of logic conditions under which the online monitor will begin to capture and store user specified channels of data.

A still further object of the present invention is to provide a single online monitor in which the logic condition that triggers the capturing of data is based on the comparison of the instantaneous value of one analog signal to a user definable function of the instantaneous value of another analog signal, or the comparison of the instantaneous value of an analog signal to a constant threshold value.

An additional object of the present invention is to provide an online monitor in which the time at which an event is declared, as defined by the satisfaction of logical conditions based on the instantaneous value of the analog signals to be monitored, is accurately captured by virtue of a time tag.

In the preferred embodiment of the invention, the invention is comprised of an online monitor control system of essential elements including, but not limited to a digital signal processing unit, a modular, interchangeable, analog signal conditioning base unit that can be tailored to the specific requirements of the process to be monitored and a modular, interchangeable, communication interface unit. The interface unit permits the digital signal processing unit to exchange data with external equipment such as network computers via a number of industry standard communication fieldbus protocols. The online monitor can be permanently attached to a device being monitored and continuously monitors a set of analog signals. It initiates data capture over a window of time when a user programmable set of conditions is satisfied. The online monitor provides the capability to define the trigger condition under which data capture is initiated by comparing a user defined signal to a function of the instantaneous value of another signal or constant. Data captured is stored indefinitely in internally battery backed memory and the instant at which data capture is initiated is determined accurately via a time tagging function, so the data can be retrieved at a later time.

Other features and advantages of the invention, which are believed to be novel and non-obvious, will be apparent from the following specification taken in conjunction with the accompanying drawings in which there is shown a preferred embodiment of the invention. Reference is made to the claims for interpreting the full scope of the invention, which is not necessarily represented by such embodiment.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
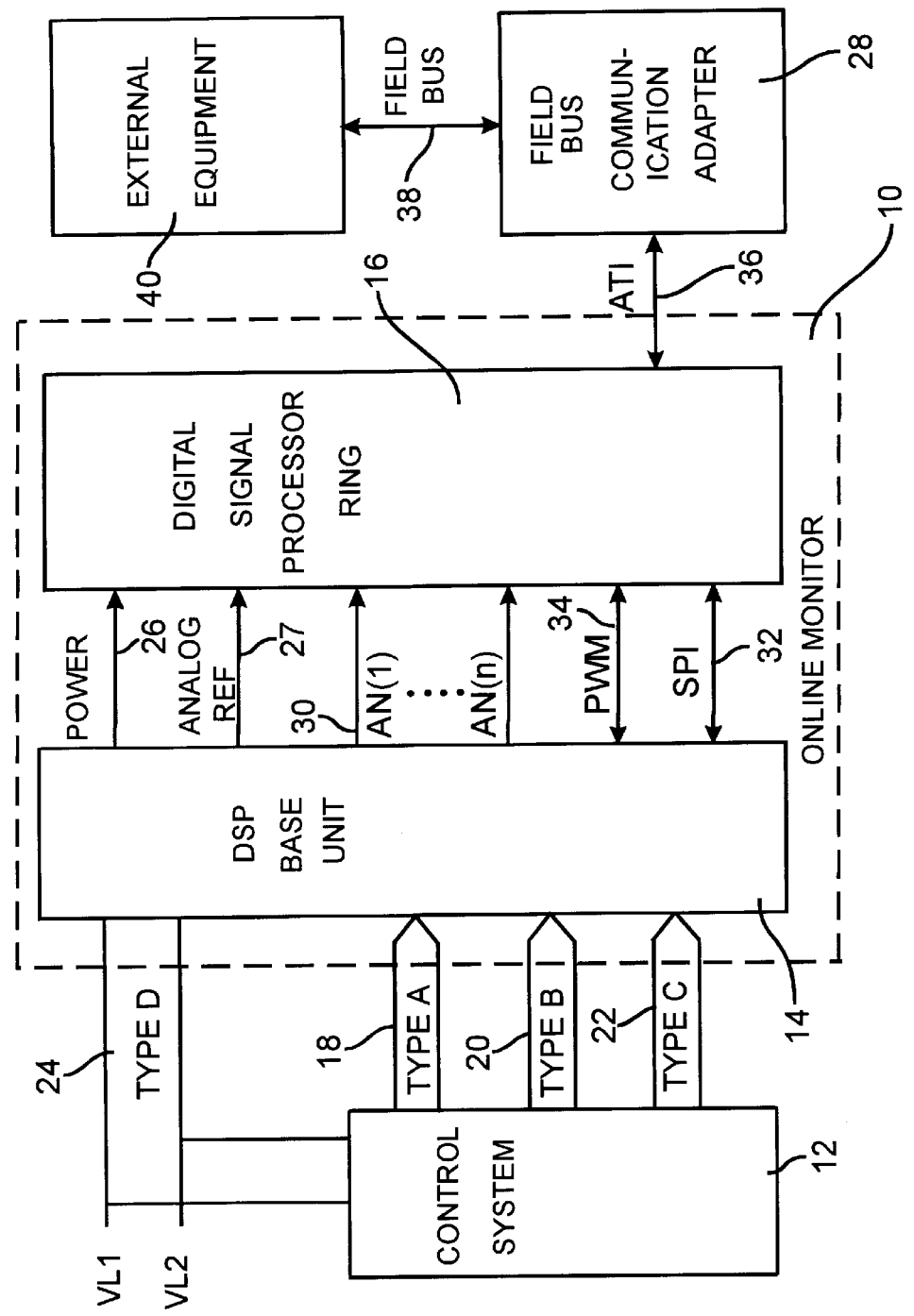
FIG. 1 is an overview block diagram of a basic control system employing an online monitoring device according to the present invention.

FIG. 1 shows an overview block diagram of a basic control system employing an online monitoring device 10 according to the present invention. The online monitor 10 monitors analog circuits a control system 12 and includes a digital signal processing (DSP) base unit 14, housed in a custom tailored polycarbonate package and a DSP ring module 16, also housed in a separate standard polycarbonate package.

To facilitate an application specification of the functional requirements of many different types of analog circuits that could be employed in control system 12, the base unit 14 can accommodate different circuit type inputs that have been classified into one of four electrical input types. They are:

Type A Inputs 18, which are differential analog circuits having a wide voltage measurement range (±160 Volts).

Type B Inputs 20, which are differential analog circuits having a narrow voltage measurement range (±2.5 Volts), but which are capable of fine resolution.

Type C Inputs 22, which are single ended analog circuits, referenced to the VL1 input of the power supply, and which have a wide voltage range of (±160 Volts), A single Type D Input 24, incorporated internal to the base unit 14 for the purpose of monitoring the power supply input voltage, VL1, VL2. Although the voltage ranges given above are specific, the invention is not limited to those ranges. Any type of electrical or electronic device capable of producing an analog signal can be monitored. These signals include, but are not limited to include; line voltages, power supply, voltages, switches, shunts, coils, thermocouples, contacts, and the like. Other voltages are possible without changing the scope of the present invention.

The DSP Base Unit 14 supplies system power 26 to the DSP ring 16 and a field bus communication adapter 28. The DSP Base Unit 14 converts the type A-D inputs into outputs 30 AN(1)–AN(n) which are feed to the DSP ring 16 and are converted into quantities that fall into the range of Analog to Digital converters in the DSP ring 16. In addition, the DSP Base Unit 14 will develop a reference 27 for the Analog to Digital converters in the DSP ring 16 comprising a high voltage reference A REF and a low voltage reference A GND. A serial peripheral interface (SPI) 32 connects the DSP ring 16 to the DSP Base Unit 14 by which the DSP ring 16 can read and write serial data to and from the DSP Base Unit 14. Two PWM (pulse width modulation) channels 34 of data can be filtered and level-shifted by the DSP Base Unit 14 to provide analog outputs.

An ATI interface 36 couples the field bus communication adapter 28 to the DSP ring 16. The online monitor can then be coupled to any external equipment 40 over a common field bus 38. The ATI interface 36 is designed to permit the DSP ring 16 to connect to many different fieldbus communication adapters 28 of which there are several models supporting a number of different fieldbus protocols, including: Modbus Plus, Devicenet, Ethernet, Interbus-S, Profibus DP, and FIP. The external equipment 40 can be used to control parametric inputs and sequencing of the online monitor 10 using the field bus 38. This could be a computer, programmable controller, or processor, for example.

Figure 2:
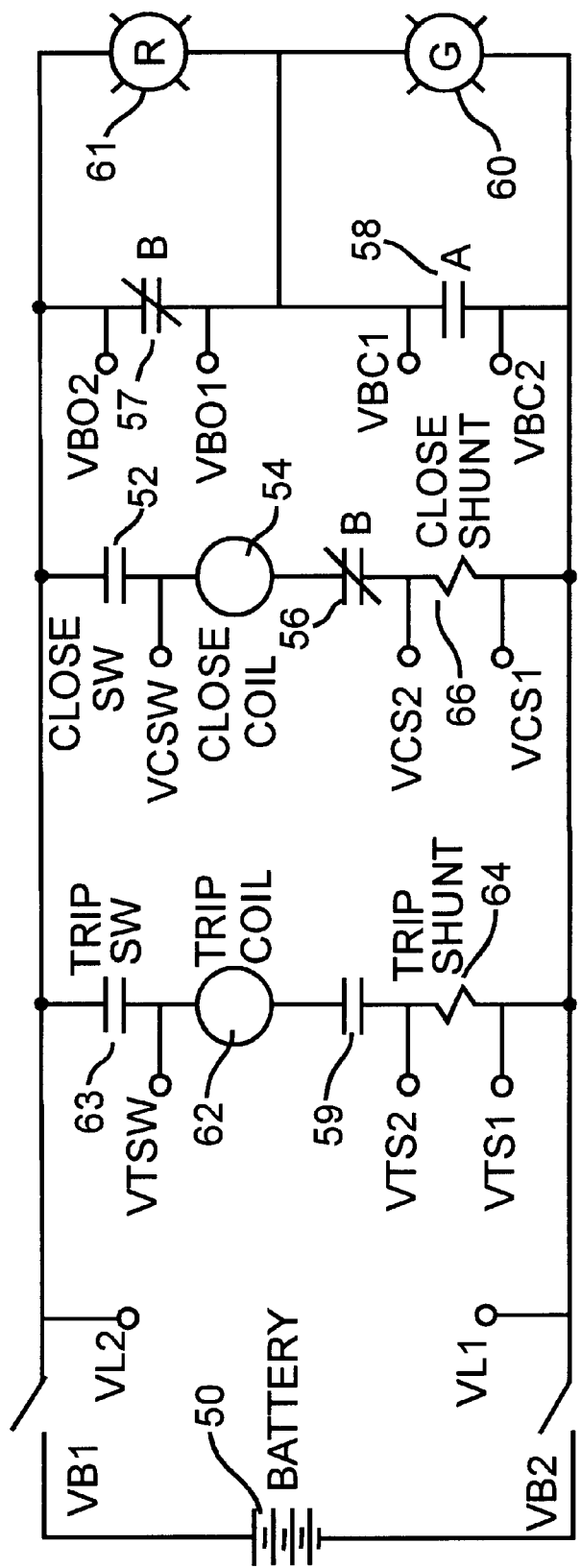
FIG. 2 is a simplified circuit diagram of a control device utilizing the online monitoring device according to the present invention.

FIG. 2 is a simplified, typical circuit diagram of the control system 12, utilizing the online monitoring device 10 according to the present invention. In this instance, the control system 12 being monitored is a the control circuit of a power circuit breaker. Other devices are possible and the use of a circuit breaker is just an example. Power, in the form of a battery 50 is applied to the terminals at the points labeled VB1 and VB2. As the circuit 12 is comprised of only electromechanical components, it is polarity insensitive, and there are applications where VB2 is positive with respect to VB1 and conversely. The line voltage, which may be nominally 48, 125 or 250 volts is one parameter to be monitored by the online monitor 10 at the points labeled VL1 and VL2 as shown, and in FIG. 1. To close the breaker, the system closes a set of contacts 52, labeled "CLOSE SW". One side of the CLOSE SW contact 52 is tied to VL2, while the other is tied to one side of a CLOSE COIL 54 at the point labeled VCSW in FIG. 2. Normally closed contacts 56 and 57, both labeled with a "B" in FIG. 2, are mechanically linked to the circuit breaker and open when the circuit breaker is fully closed. Assuming the circuit breaker is initially open and contacts 56 and 57 initially closed, current flows through CLOSE COIL 54, actuating the mechanism that closes the circuit breaker. Assuming the normally closed contacts 56, 57 B are closed, current flows through the close coil 54, actuating the mechanism that closes the breaker. When the breaker is mechanically closed, the breaker mechanically closes the contacts 58, 59 labeled "A" in FIG. 2, and opens the normally closed contacts 56, 57 labeled "B". This accomplishes two things in the diagram shown:

1. lamp 60 labeled "G" is extinguished and lamp 61 labeled "R" is lighted,
2. CLOSE COIL 54 is automatically de-energized, and TRIP COIL 62 is enabled by virtue of the closure of normally open contacts A 59, so that closing TRIP SW 63 can trigger an opening of the breaker.

Opening the breaker requires that the breaker is mechanically closed, which closes the contacts 58 and 59, both labeled "A" in FIG. 2. When contacts 58, 59 are closed, closing the TRIP SW 63 energizes the TRIP COIL 62, which actuates the breaker opening mechanism. When the breaker is fully open, the normally closed contacts 56 and 57, are again closed, and normally open contacts 58 and 59 again open. Integral to the breaker mechanism is protection against simultaneous closing of the "A" and "B" contacts.

Integral to the Circuit Breaker Monitor circuit 12 are two calibrated current shunts 64, 66, each employing Kelvin connections, that allow the current in the TRIP COIL 62 and CLOSE COIL 54 to be monitored by the on line monitor 10. The current and voltage profile of the CLOSE COIL 54 and TRIP COIL 62, along with the monitoring of voltage across the auxiliary contacts A and B, provide considerable information regarding the state of the circuit breaker. Some work has been performed indicating that this information can be used to detect incipient faults in the breaker itself.

Figure 3:
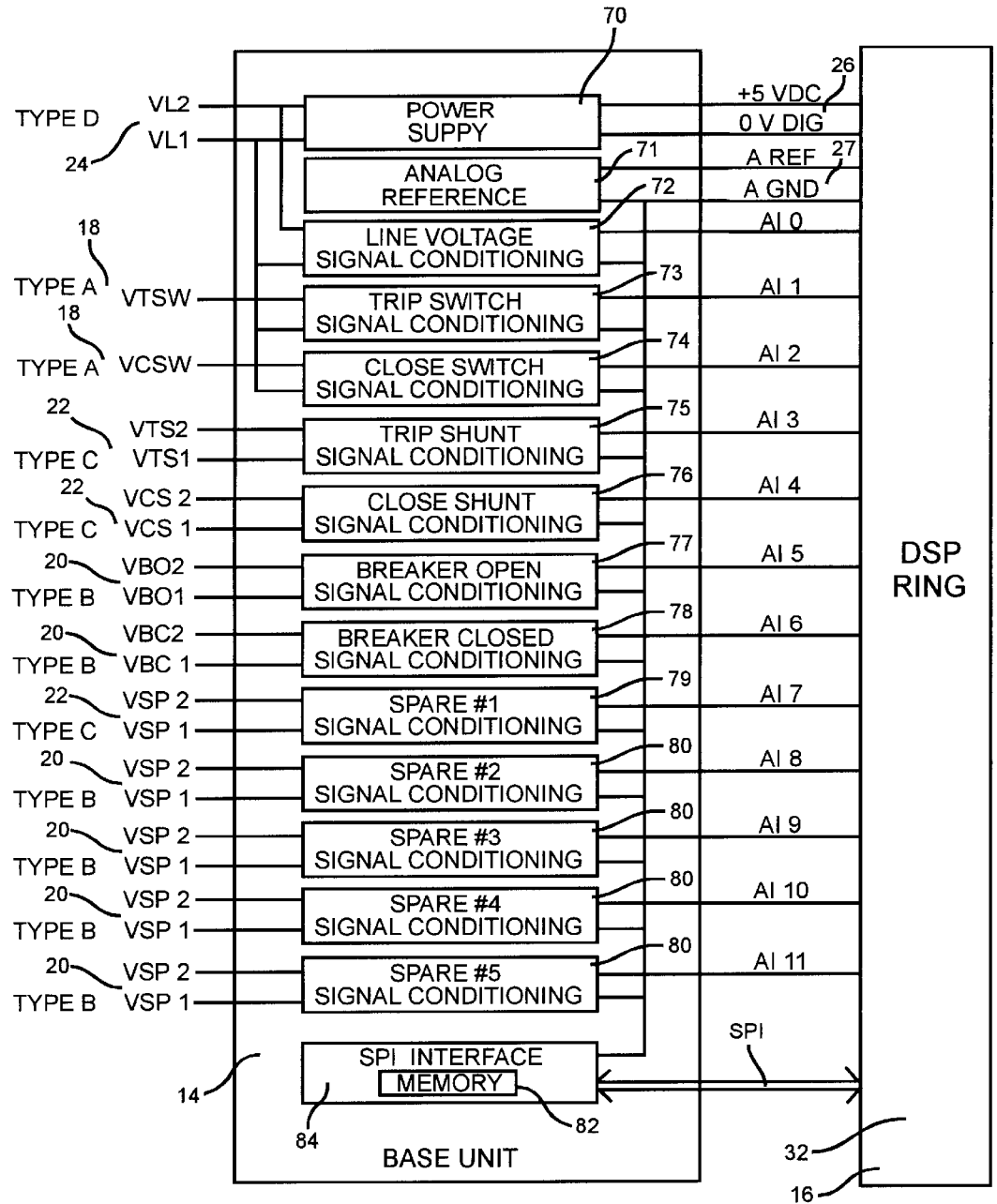
FIG. 3 is a simplified block diagram of a base unit depicted in the online monitoring device shown in FIG. 1.

FIG. 3 provides a simplified block diagram of the DSP Base Unit 14 depicted in the online monitoring device 10 shown in FIG. 1. The DSP Base Unit 14 power supply 70 is capable of providing all voltages required of the online monitor 10, including those required to operate the DSP ring 16 and the field bus communication adapter 28. The nominal operating voltage for the online monitor is 5 VDC. The supply voltage 24, (VL1, VL2) could be supplied by the battery 50 and is also the voltage used in the control circuit 12. Measured line voltage magnitude, VL2 is with respect to VL1. The DSP Base Unit 14 is designed to be insensitive to polarity of this line voltage.

The DSP Base Unit 14 provides an analog voltage reference 71, A REF, and A GND, against which all other analog measurements are made. In this way, analog bases can be interchanged with DSP rings 16 without re-calibration. A standard, off the shelf voltage reference IC chip is employed to accomplish this with a nominal reference voltage of 4.096 Volts. This voltage reference is generated from the +5 VDC power supply 70, which should operate between the limits of 4.5 V to 5.5, V over the entire temperature, line voltage and load voltage range supported by the online monitor 10. As such, the voltage reference should be stable within +/−4 $\mu$V as a result of line voltage variation. Nominal voltage reference is at 0 mA. This parameter is specified at $V_s$=5.4 VDC, and is valid over the range 0<$I_{load}$<30 mA. In this application, the load current should be relatively constant, so a more appropriate measurement is a differential measurement.

The power supply is fuse protected and the Type D Analog Input circuit is designed to coordinate with that protection. In other words, the Type D Analog Input circuit may operate on the load side of the power supply fuses, but can operate without causing damage to the module over the same voltage range and same conditions as the protected power supply.

As power to the DSP Base Unit 14 is provided by the line voltage source, battery 50, to be monitored, the DSP Base Unit 14 provides an internal Line Voltage signal conditioning circuit 72. This is a Type D analog input circuit which provides signal scaling, level shifting and pre-filtering, resulting in a signal A I0 that is compatible with the Analog to Digital circuit requirements of the DSP Ring 16. Line Voltage is defined as the measured voltage VL2 relative to VL1 2, with positive voltage defined by VL2>VL1. The online monitor 10 is capable of checking line voltage and current. It therefore can provide a snapshot of the state of the battery 50 before, during and after activation of the circuit breaker.

Twelve signal conditioning circuits of the types A 18, B 20, C 22, and D 24 are provided on the DSP Base Unit 14 to monitor the signals of the circuit breaker monitor circuit. The present invention, however is not restricted to the mix of types as shown for the illustrated example. The DSP Base Unit 14 can customized to fit any application. The conditioning circuits perform signal conditioning on the input signals, comprising band limiting analog filters, level gain and level shifting, and creating a signal that is in the range of the analog to digital converters of the DSP ring 16. The twelve inputs are:

A LINE VOLTAGE circuit 72, designed to measure the voltage between VL1 and VL2 in FIGS. 1 and 2. This is a Type D 24 input. The output signal is AI 0.

A TRIP SWITCH circuit 73, designed to measure the voltage between VL1 and VTSW in FIG. 2. This is a Type A 18 input. The output signal is AI 1.

A CLOSE SWITCH circuit 74, designed to measure the voltage between VL1 and VCSW in FIG. 2. This is a Type A 18 input. The output signal is AI 2.

A TRIP SHUNT monitoring circuit 75, designed to measure the voltage between VTS1 and VTS2 in FIG. 2. This is a differential voltage measurement to accommodate a Kelvin connection to the shunt. This is a Type C 22 input. The output signal is AI 3.

A CLOSE SHUNT monitoring circuit 76, designed to measure the voltage between VCS1 and VCS2 in FIG. 2. This is a differential voltage measurement to accommodate a Kelvin connection to the shunt. This is a Type C 22 input. The output signal is AI 4.

A BREAKER OPEN CONTACT monitoring circuit 77, designed to measure the differential voltage between VBO1 and VBO2 in FIG. 2. This is a Type B 20 input. The output signal is AI 5.

A BREAKER CLOSED CONTACT monitoring circuit 78, designed to measure the differential voltage between VBC1 and VBC2 in FIG. 2. This is a Type B 20 input. The output signal is AI 6.

A single spare SHUNT monitoring circuit 79, designed to measure a third shunt connection, and having the same signal requirements as the TRIP SHUNT and CLOSE SHUNT measuring circuits. This is a Type C 22 input. The output signal is AI 7.

Four spare CONTACT monitoring circuits 80, with characteristics identical to the BREAKER OPEN CONTACT 77 and BREAKER CLOSED CONTACT 78 monitoring circuits. These are Type B 20 inputs. The output signals are AI 8–11, respectively.

The two type A circuits 73, 74 are single ended and voltages are measured relative to the signal VL1 in FIGS. 1 and 2. The voltage measuring circuits, when connected to the DSP ring are capable of operating within parametric limits set by calibration data stored in memory 82 of a SPI interface 84. This data is sent from the DSP ring 16 over the SPI channel 32 during a calibration procedure during the manufacturing process.

The DSP Base Unit 14 has six Type B differential analog measurement circuits 77, 78, and 80 and are designed for differential measurement of the auxiliary contact voltage between VBO1 and VBO2 and VBC1 and VBC2 as shown in FIG. 2. The parametric limits for Type B Analog Inputs are also set forth in by calibration data stored in memory 82. Common mode voltage is measured relative to VL1 as shown in FIG. 2.

The DSP base also provides three identical Type C analog inputs circuits, 75, 76, and 79, shown in FIG. 3, to monitor voltages developed across Trip Shunt 64 and Close Shunt 66 in FIG. 2 by current flowing through Trip Coil 62 and Close Coil 54, respectively. These circuits are differential in nature and are designed to comply with the parametric requirements set by the calibration data stored in memory 82. The inputs are measured between VTS2 and VTS1 in the case of the Trip Shunt and VCS2 and VCS1 in the case of the Close Shunt, both shown in FIG. 2. In normal application, the voltage across a shunt will be in the range −1.0 to 1.0 volts. The normal voltage measurement range of the system is intended to be −2V to +2V, to accommodate both positive and negative reference circuits, as well as coil currents that are in excess of the nominal values. Because a shunt can become open, this circuit of the DSP Base Unit 14 can be exposed to voltage of up to 300 Volts in the normal operation of a 250 Volt circuit breaker. When this condition occurs, protection against overvoltage is provided such that a) the circuit is not damaged by the overvoltage and b) the open shunt is detectable by means of measuring a differential voltage magnitude in the range 2–2.5 volts. Common mode voltage is measured with respect to VL1 as shown in FIG. 2.

The SPI interface 84 includes multiplexing signals so the DSP ring 16 can access multiple channels of data from the DSP Base Unit 14. Examples of channels of data that can be accessed via the multiplexed SPI interface are: Calibration data regarding the DSP Base Unit 14 that the DSP ring 16 would use to provide scaling information and "potless" calibration of the DSP Base Unit , resulting in a systems that are more stable with age and temperature than could be achieved using more conventional adjustment techniques, digital inputs from and digital outputs to the DSP Base Unit, and an interface to serial Digital to Analog converters in the DSP ring 16.

Figure 4:
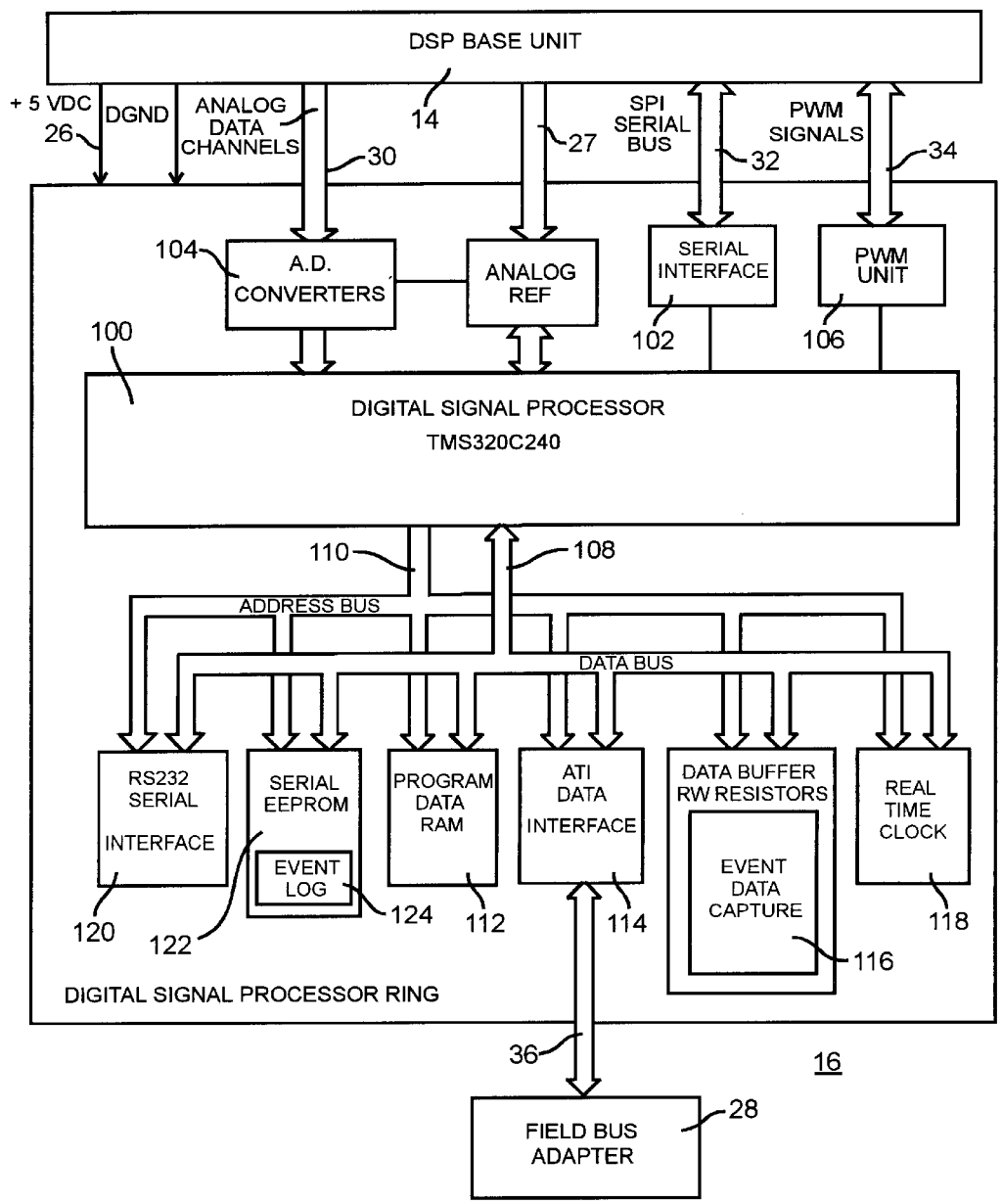
FIG. 4 is a simplified block diagram of a digital signal processing ring depicted in the online monitoring device shown in FIG. 1.

A simplified block diagram of a digital signal processing ring 16 depicted in the online monitoring device 10 shown in FIG. 1 is illustrated in FIG. 4. Signals between the DSP Base Unit and the DSP ring include the +5 VDC power supply and return OV DIG. Sixteen (16) single ended analog inputs 30, 2 PWM signals 34 from the DSP ring 16 to the DSP Base Unit 14 for generating analog voltage outputs, and an SPI serial interface 32 to couple to the digital inputs and outputs on the DSP Base Unit 14.

The DSP Base Unit 14 provides the DSP ring 16 the analog voltage reference, that serves as an accurate reference for the analog input signals generated by the DSP Base Unit 14. This signal very nearly tracks that of the digital reference, (DGND) 26 provided to the DSP Ring by the DSP Base Unit 14. As such, under normal circumstances, they should track each other fairly accurately, the difference being that the A GND signal carries very little current since it is a Kelvin type connection. As discussed above, the reference for the analog inputs is also derived in the base to which it is attached. In applications where ratiometric measurements are possible, a low cost solution is to use a filtered version of the VDC power supply 26 as the analog reference. If absolute voltage measurements are required, there are several accurate, stable voltage reference integrated circuits available. This voltage is referenced to the signal A GND, the analog reference voltage. The intent is to have A GND and D GND at the same nominal potential, with A GND the reference for the analog signals on the DSPB. As such, under normal operation, these signals should not differ by more than a few mV.

The 12 single ended analog inputs 30 are each referenced to the AGND signal. The philosophy is that the DSP Base Unit provides all necessary signal conditioning and dielectric isolation for the given analog signals.

A TMS320240, manufactured by Texas Instruments, digital signal processor (DSP) 100 controls operation of the overall system. It communicates with the DSP Base Unit 14 over SPI serial bus 32 serial interface 102. Analog to digital converters 104 convert the 12 single ended analog inputs 30 into digital data that can be processed by the DSP 100. The PWM unit 106 processes the PWM signals 34.

An internal data bus 108 and address bus 110 allows the DSP 100 to access-various memories and other peripheral devices. In addition to a RAM internal to the DSP 100, a data program RAM 112 provides additional memory for storing program data. This allows for downloading application programs and data received by an ATI serial interface 114 from external equipment 40 connected to the field bus 38, field bus adapter 28, and ATI bus 36.

A time of day clock 118 is incorporated in the DSP ring 16 to permit the association of time tags with events. This clock is not used for interval timing of events. The real time clock circuit 118 is provided with battery backup. The same battery provides backup for the Event Data Capture Buffer 116 to prevent loss of data if a power failure occurs. An RS232 serial interface 120 provides communication to the outside world for commissioning and program download. In certain applications, this link may be used to communicate with external equipment, such as a Global Positioning System (GPS). This facilitates synchronization of the time day clock with the GPS and provide a very accurate time stamp for any event occurrence.

An eight megabit, battery backed memory serves as an Event Data Capture memory 116 for storing captured events. In the embodiment described herein, the event data capture memory 116 is organized as 32 16 k buffers henceforth called the Event Capture Data Buffers (ECDBs) that can be accessed by external equipment 40 through the field bus adapter 28 and ATI interface 114. Thirty-Two (32) corresponding individual Event Buffer Status Registers are maintained by the DSP to reflect the status of the corresponding Event Data Capture Buffers. The individual Event Capture Data Buffer Status Registers are henceforth labeled ECBSR0, . . . , ECBSR15, and the term ECBSR is used to signify a general Event Capture Data Buffer Status Register. Each ECBSR is organized as shown in Table 1.

TABLE 1

Event Capture Data Buffer Status Register Definition
EBSR0, . . . , EBSR15

| BIT | | | | | | | | | | | | | | | |
|---|---|---|---|---|---|---|---|---|---|---|---|---|---|---|---|
| D15 | D14 | D13 | D12 | D11 | D10 | D9 | D8 | D7 | D6 | D5 | D4 | D3 | D2 | D1 | D0 |
| TRIGGER FIELD | | RESERVED | | | CLOCK | | EVENT TYPE FIELD | | | | DATA AGE FIELD | | | | |
| IU | TT | U | U | U | CSS | CS | ET3 | ET2 | ET1 | ET0 | DA4 | DA3 | A2 | DA1 | DA0 |

The IN USE bit of an ECBSR, labeled IU in Table 1, is set by the DSP 100 to indicate that the corresponding data capture buffer contains valid data from an event capture. A command in the online monitor 10 command set allows the user to release an individual data capture buffer for re-use by the online monitor 10. When this command is communicated to the online monitor 10 via the fieldbus 38, one of the activities associated with the command is to clear the IN USE bit of the corresponding ECBSR.

The Trigger Type bit, labeled TT in Table 1, indicates whether the event for which data is stored in the corresponding data capture buffer was triggered by means of satisfaction of the user specified logical conditions for a trigger, or forced by means of a user command delivered from External Equipment 40 to the online monitor 10 via fieldbus 38. Events captured as a result of satisfaction of the logical conditions for a trigger are indicated as a logic 0 in the TT field, whereas events captured by forcing via a user command are indicated as a 1 in the TT field.

The Clock Sync State bit of an ECBSR, labeled CSS in Table 1, is set by the DSP 100 to indicate that the real time clock 118 was synchronized with an external clock source, such as a global positioning system, at the time the trigger for the event for which data is stored in the corresponding data capture buffer was detected. If no such synchronization existed at the instant the event was triggered, the CSS bit is cleared.

The Clock State bit of an ECBSR, labeled CS in Table 1, indicates the validity of the time tag generated by the real time clock 118 at the instant the event for which data is stored in the corresponding data capture buffer was detected.

If the diagnostic routines in the real time clock 118 indicate that the clock was operating normally, and that a valid time had been loaded into the clock prior to this event, the DSP 100 sets the CS bit. Otherwise, the DSP 100 clears the CS bit. This is particularly applicable to the condition in which the battery that powers the real time clock 118 and the battery backed data capture RAM 116 on the online monitor 10 has depleted and power has been subsequently removed from the online monitor 10.

Four EVENT TYPE bits, labeled ET0–ET3 in Table 1 indicate the user defined event number that was triggered to cause the DSP 100 to store data in the corresponding data capture buffer.

Five DATA AGE bits, labeled DA0–DA4 in Table 1 indicate the sequential age of the data in the corresponding data capture buffer, with a value of 0 indicating the oldest data and the largest number (in the range 0–31) indicating the most recent data.

Three reserved bits, labeled U is Table 1 are reserved for future expansion.

A separate serial EEPROM 122 provides a minimum of 256 16-bit words to support an Event Log 124 and Parametric Data sections. The EEPROM is selected with a "block write" feature that allows small sections of code to be written at a time. Additional space within this EEPROM could be used for program memory if desired and to store calibration data.

In addition to the real analog channels 71–80, the online monitor 10 supports 16 virtual channels of data, primarily for use as thresholds for triggering events. These virtual channels, symbolically labeled Y16–Y31, but assigned actual register numbers in the software application can be written to and accessed via register access commands defined below. These registers are internal to the DSP 100.

The DSP 100 provides 16 bits for addressing of Random Access Memory and as such can address a total of 65,536 16 bit words of RAM. Because the Event Data Capture memory 116 is organized as 524,288 words, a multiplexing scheme is required. The DSP 100 is provided with several programmable outputs, five of which are used by the DSP software to select which of the 32 blocks of 16 k words of Data Buffer Memory 116 is accessed during DSP 100 read and write instructions.

Figure 5:
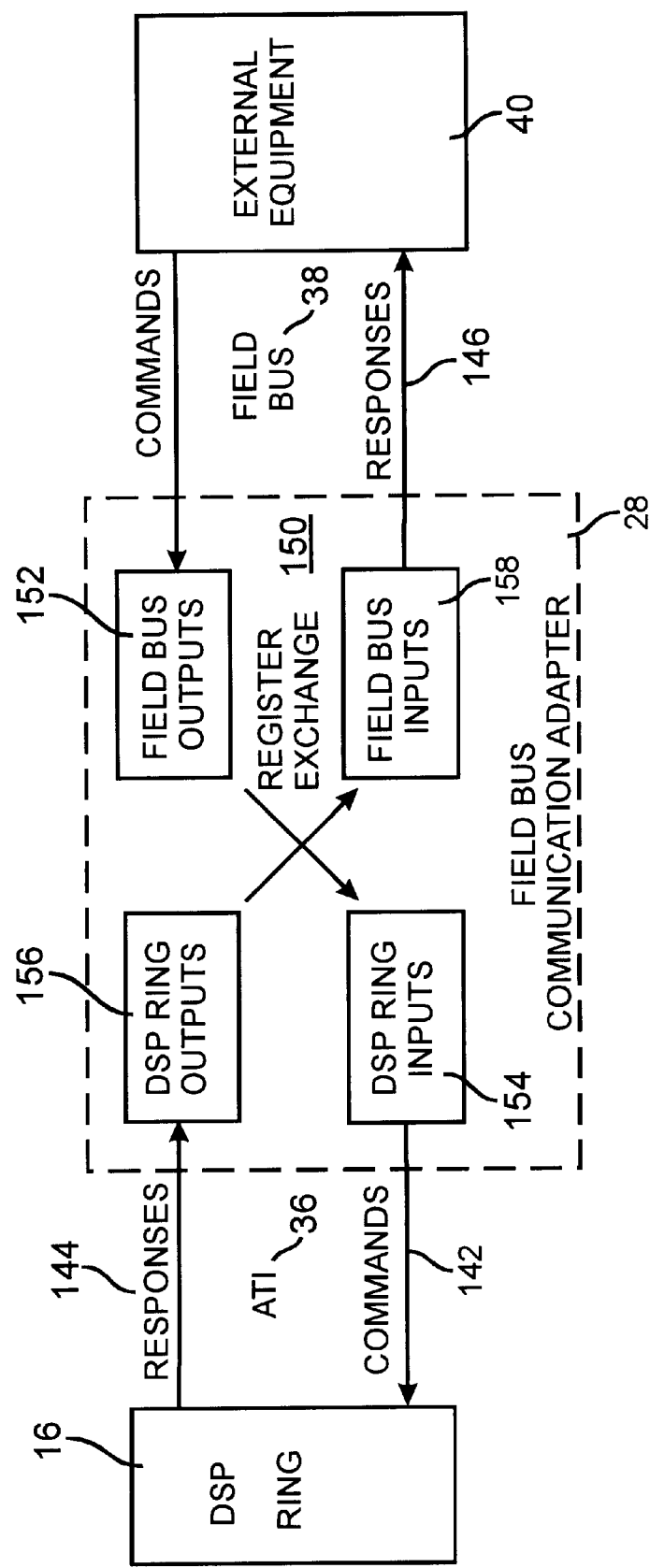
FIG. 5 is a signal flow chart illustrating a field bus communications adapter as depicted in the online monitoring device shown in FIG. 1.

A signal flow chart illustrating the field bus communication adapter 28 is depicted in FIG. 5. The online monitor 10 communicates entire data objects across the ATI interface 36 in the form of commands 140, 142 from the external equipment 40 to the online monitor 10, as well as communicate data responses 144, 146 corresponding to those commands. In this configuration, a field bus communications adapter 28, such as a standard "Momentum tophat" is employed between the external equipment 40 and the DSP ring 16. The external equipment 40 communicates with the field bus communication adapter 28 via a selected fieldbus 38. The DSP Ring communicates with the field bus communications adapter 28 via the ATI interface 36. Both of these interfaces operate independently of the other. To get data, in the form of the commands 140, 142, from the external equipment 40 to the DSP ring 16, the field bus communication adapter 28 performs a register exchange 150 in which the outputs 152 from external equipment 40 are transferred to the inputs 154 to the DSP ring 16. Likewise, to get data, in the form of the responses 144, 146, outputs 156 from the DSP ring 16 are transferred by the register exchange 150 to the inputs 158 of the external equipment 40.

The field bus communication adapter 28 is optimized for transmission of simple digital or analog inputs and outputs across its interface. No synchronization of data is required. As such, in most applications, the register exchange performed by the field bus communication adapter 28 is asynchronous with respect to both the external equipment 40 and the DSP ring 16. A layer is added to the communication scheme to address the following issues: When the external equipment 40 sends a command to the online monitor 10, it knows that the command was properly received by the fieldbus communication adapter 28 by virtue of protocol integral to the fieldbus. The external equipment 40 does not know when it is safe to send another command to online monitor 10. Similarly, given that there are two levels of asynchronous exchange occurring in the communication network, the external equipment 40 does not know when the data received by the online monitor 10 represents the response of the online monitor 10 to a particular command.

This added layer uses a simple token passing scheme with the online monitor 10 designated as a slave in a master-slave configuration. Commands from the external equipment 40 to the online monitor 10 take the form of a command identifier followed by one or more parameters i.e.

TOKEN#
COMMAND
[PARAMETER DATA BLOCK]

Where:

TOKEN# identifies the operation throughout the system,
COMMAND is an op-code that uniquely identifies to the online monitor 10 the operation to perform associated with TOKEN #, and
is a fixed sized block of parameter registers that contains the parametric data associated with the command.

The online monitor 10 identifies a register exchange via the ATI interface 36 as a "new command" when it detects a change in TOKEN#. The response message from the online monitor 10 to the receipt of a command string per above is:

TOKEN#
STATUS
[RESPONSE DATA BLOCK]

Where:

TOKEN# identifies the command processed and is the same value as the received TOKEN# above.
STATUS is a one-register status word indicating the status of the system.
[RESPONSE DATA BLOCK] is a fixed length block of registers (of the same length as [PARAMETER DATA BLOCK] above), that contains the data pertinent to the processed command.

The external equipment 40 uses detection of TOKEN# in the response as confirmation that the command identified by TOKEN# is completely processed by the online monitor 10 and the data attached to the return data is, in fact, the complete response of the online monitor 10 to the command.

In the response, the data associated with is subject to interpretation based on the STATUS of the response. It is assumed that the external equipment 40 will continue to assert the present command structure and will not assert a new command structure until it has received the appropriate response.

In the ATI Interface 36, the PARAMETER DATA BLOCK and RESPONSE DATA BLOCK contains the same number of registers. In the preferred embodiment described herein, the ATI Interface 36 supports a PARAMETER_DATA_BLOCK of 30 registers. This implies that each and every register exchange between the DSP ring 16 and the field bus communication adapter 28 will comprise 30 registers of data, in addition to the TOKEN and COMMAND or TOKEN and STATUS, dependent upon the direction of data.

Figure 6:
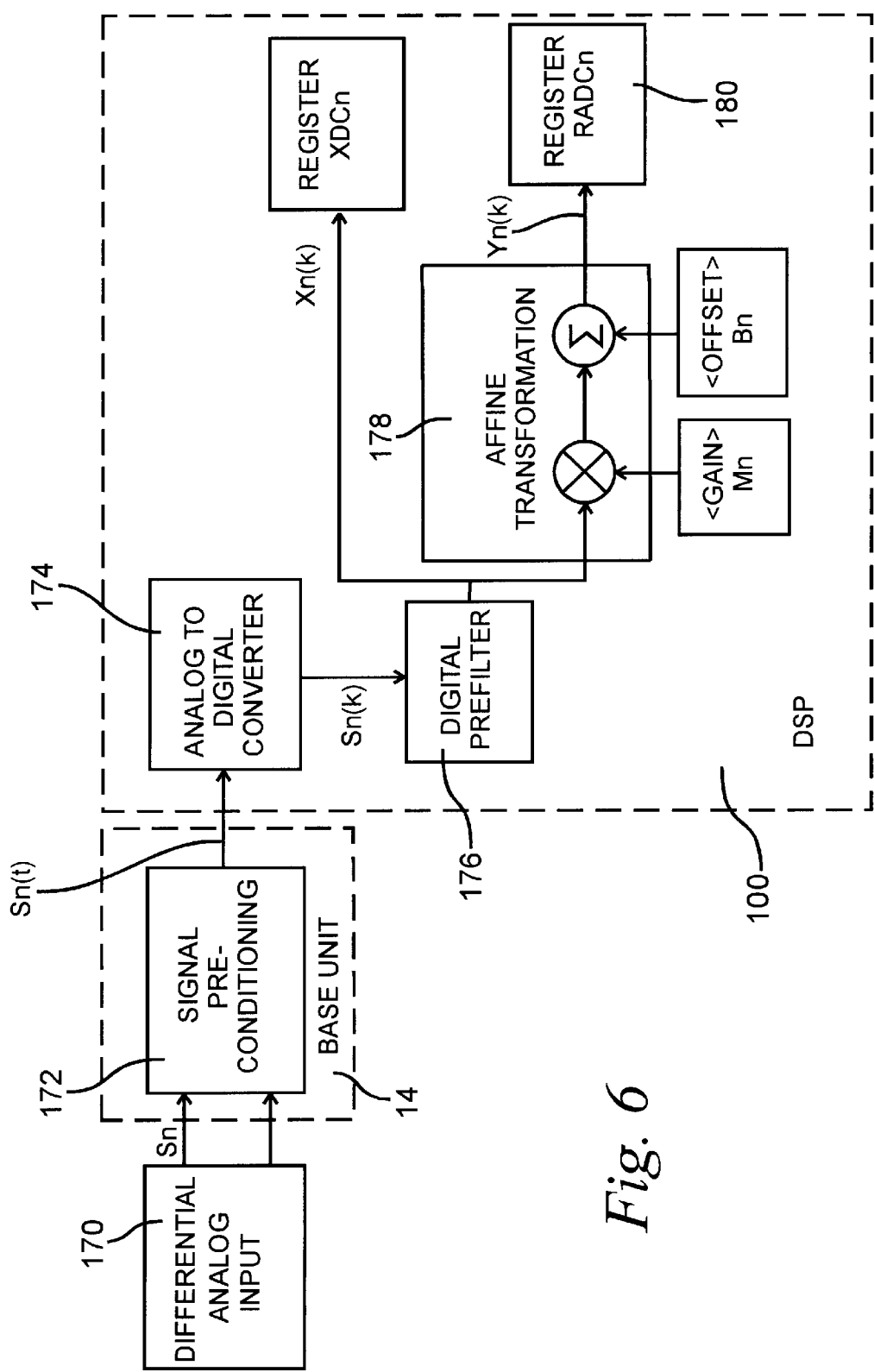
FIG. 6 is a signal flow chart illustrating a real analog data channel in the online monitoring device according to the present invention.

FIG. 6 is a signal flow chart illustrating a generation of a real analog data channel (RADC) from an analog signal 170. This analog signal could be a type A, B, C, or D input as discussed previously. This flow is identical for each analog input of the online monitor 10. For the nth differential analog input 170, the time varying input signal Sn(t) is first fed to an analog signal pre-conditioning circuit 172, located on the DSP Base Unit 14. The analog signal preconditioning circuit 172 includes signal level shifting circuitry which performs a mapping from the normal expected range of the input signal, to a voltage that lies within the range of the analog to digital converter 174, nominally 0–4.096 Volts. In the preferred embodiment, the nominal design of the analog signal pre-conditioning circuit takes into consideration the inaccuracies of the individual components that make up the circuit such that the actual span of the output of the signal preconditioning circuit 172 is guaranteed to lie within the operating range of the analog to digital converter circuit 174 when the values of the individual components comprising the analog signal pre-conditioning circuit 172 lie within their manufacturer specified tolerances. The analog signal pre-conditioning circuit 172 also provides an anti-aliasing filter function that limits the frequency content of the output signal S^n(t) to the Nyquist frequency, defined as half the sampling frequency of the online monitor 10. Since the online monitor 10, in its preferred embodiment, samples each analog signal at a rate of 5 kHz, the analog signal preconditioning circuit must of necessity limit the frequency content of the signal S^n(t) to less than 2.5 kHz in order to avoid the phenomenon in sampled data systems commonly known as aliasing.

In the preferred embodiment, the primary digital signal processing element is DSP 100. This microchip and its associated external data memory form the basis for the DSP ring 16 previously described in FIG. 4, The analog to digital converter 174 is actually one of two 8 channel, 10 bit analog to digital converters implemented integral to the DSP 100 microchip. Versions of the online monitor 10 could also be implemented in which the analog to digital converter 174 is located outboard of the DSP 100 and it should be noted that the analog to digital converter 174 could just as easily be located on the DSP base module 14. It makes for fewer connections between the DSP Base Unit and the DSP Ring 16. Although the system would be more accurate because the entire analog system is located on a single board, the disadvantage and limiting factor is that the ADC's wont fit on the present packaging for the modular system DSP base in most applications.

As stated above, one of the analog to digital converters 174 samples the signal S^n(t) shown in FIG. 6 each 200 microseconds and maps the sampled value into a digital number in the range 0–1023 which is stored in a data memory of the DSP 100. The resulting digital value is shown in FIG. 6 as S*n(k), where k refers to the kth such sample of the waveform.

The sampled data value S*n(k) is then filtered by digital filter 176, implemented in software using programming features of the DSP 100. A four point windowing filter is employed that computes the average of the most recent four samples of channel n, including the sample just taken. Other filter topologies can be readily implemented using the DSP 100 programming features, but the present filter provides adequate performance with minimal signal processing time. The resulting output of the digital filter is shown in FIG. 6 as Xn(k).

The DSP 100 then performs an affine transformation 178 of the form Y=MX+B on the filtered digital signal Xn(k) to map Xn(k) into an integer value representative of the intended interpretation of the analog value of the signal Sn(t). This it does by multiplying Xn(k) by a constant gain, shown in FIG. 6 as Mn to form the digital value Zn(k) and adding to it a constant offset value Bn to form the final real analog data channel value Yn(k) 178. The actual values of Mn and Bn required to map the signal Xn(k) into a number representative of the intended interpretation of the analog signal Sn(t) are computed during a calibration of the analog channel as an integral part of the manufacturing process of the DSP Base Unit 14 and are stored in the serial EEPROM 82 located on the DSP Base Unit 14 module. The final computed value Yn(k) is stored in the register RADCn 180 of the DSP data memory, where it can be used by other functions of the online monitor 10.

In addition to the real analog channels 71–80, the online monitor 10 supports 16 virtual channels of data, primarily for use as thresholds for triggering events. These virtual channels, symbolically labeled Y16–Y31, but assigned actual register numbers in the software application, can be written to and accessed via register access commands sent to the online monitor 10 from external equipment 40 via the fieldbus 38. These registers are internal to the DSP 100. The virtual analog data channels are not updated by the DSP 100 on each scan cycle, but their values can be explicitly set by the external equipment 40.

To permit quick access to the data buffers, the DSP Ring 100 provides separate hardware pointers for reading and writing to the various Event Capture Data Buffers. To conserve processing time, the online monitor 10 has a data buffer access pointer, DBAP, pointing to the buffer to be accessed by the external equipment 40 when a request to read data from the data buffers is made. The online monitor 10 also has a command that permits the external equipment 40 to release a specified Data Buffer back to the online monitor 10. Once a data buffer has been released, the Data Buffer can be used for subsequent storage of an event. An "All Buffers In Use" condition exists when one of the following conditions exists:

all buffers contain complete data from captured events, or 31 buffers contain complete data from captured events, and the online monitor 10 is in the process of logging an event.

A DATA_BUFFERS_FULL (DBF) bit in status register SR1 as defined in Table 2 below is set whenever one of the above conditions exists and is cleared under all other conditions.

Figure 7:
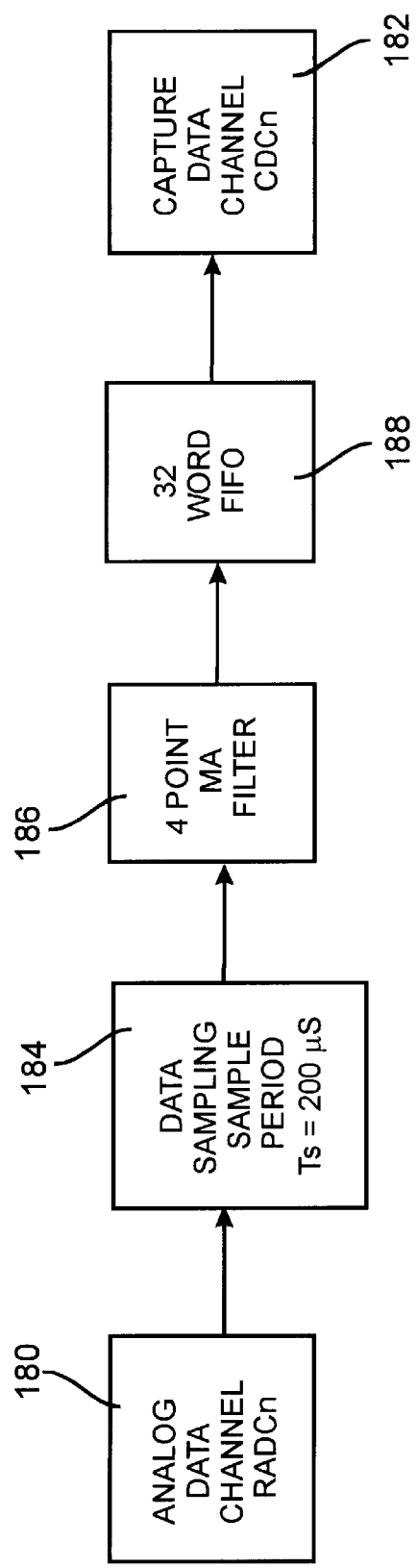
FIG. 7 is a signal flow chart illustrating a data capture channel in the online monitoring device according to the present invention.

A signal flow chart in FIG. 7 illustrates a data capture channel in the online monitor 10 according to the present invention. In the DSP Ring 16, the DSP100 maintains 12 Capture Data Channels (CDCn) of information, derived from the Real Analog Data Channels (RADC) 180. The RADC channels 180 are updated at a DSP sample period 184 of 200 μS. The RADC channel samples are averaged in a 4 point moving average (MA) filter 188. The output of this filter feeds a 32 word First In—First Out (FIFO) delay line 186. The output of the FIFO is its input delayed by 32 Capture Data Channel (CDC) scans. This output is stored in the register CDCn 182 for instantaneous retrieval by the external equipment as desired. The Analog Data channels are used to develop the logic by which events are triggered. The data stored in the data buffers when an event occurs is the Capture Data Channel. The capture data channels are delayed by 32 scans (6.4 mS) to provide some pretrigger information The online monitor 10 provides the capability to store a "snapshot" of the data in the Real Analog Data Channels, RADCn 180. Such a "snapshot" can be triggered explicitly by an ANALOG_DATA_SNAPSHOT command communicated to the online monitor 10 from external equipment 40 via the fieldbus 38. When the online monitor 10 encounters an ANALOG_DATA_SNAPSHOT command, at the end of the next elementary scan, the data in each Real Analog Data Channel register, RADCn 180 is copied to a corresponding Analog Data Channel Snapshot register, ADCSn described below. This provides the external equipment 40 the capability to read a consistent set of instantaneous analog data.

The online monitor 10 is considered in an Event In Progress State when a valid trigger has been received and an Event Data Buffer is available to capture the data. The online monitor 10 signals this condition by setting the Capture In Progress (CIP) bit in system status register SR1. The online monitor 10 continuously maintains SR1 as the STATUS register, returned with the respone of each command as described above, and by which the external equipment 40 can readily determine the status of the online monitor 10.

The Battery Low (BLO) bit is set when the system has detected a low-battery condition. Under other circumstances, BLO is cleared.

The Reset (RST) bit is set when the system has been reset for any reason since the last command response was issued. It is cleared otherwise.

The System Error (SE) bit is set when the system has detected a hardware error. It is cleared otherwise.

The New Data (ND) bit is set whenever one or more events have been captured since the response to the last command was issued by the online monitor 10. Monitoring this bit in conjunction with the READ_DATA_BUFFER_STATUS command gives the user a quick method of determining that new data is available, and how to access it.

The Capture In Progress (CIP) bit is set whenever the online monitor 10 is actively capturing and storing data into an Event Capture Data Buffer. When no data capture is occurring, this bit is cleared.

TABLE 2

System Status Register SR1

| D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|
| M1 | M0 | | | | | ND | SE | RST | BLO | DCM | CSS | CS | DBF | EA | CE |

System Status Register SR1

The following describes the significance of the individual bits in SR1.

The Command Error, (CE) bit is set when an error is detected in processing a command. When this bit is set the information in the Response Data Block contains information regarding the error.

The Events Available (EA) bit is set when there are one or more complete data capture buffers available that have not yet been released by the external equipment 40 and is cleared when all data capture buffers have been released.

The Data Buffers Full (DBF) bit is set when all data capture buffers contain valid data and is cleared when at least one data capture buffer is available to accept new data.

The Clock State (CS) bit indicates that diagnostic routines in the real time clock indicate that the clock is operating normally, and that a valid time has been loaded into the clock prior to this event. Otherwise, the DSP clears the CS bit. This is particularly applicable to the condition in which the battery that powers the clock and battery backed data capture RAM on the OLM has depleted and power has been subsequently removed from the OLM.

The Clock Sync State (CSS) bit is set by the DSP to indicate that the real time clock is presently synchronized with an external clock source, such as a global positioning system. When no such synchronization is detected, the DSP clears the CSS bit.

The Data Capture Mode (DCM) bit of SR1 denotes the capture mode of the OLM. If DCM is set to a logic 1, the OLM is in the FIRST capture mode, indicating that when all data capture buffers have filled, on subsequent events, the OLM will not capture further data until one or more buffersare RELEASED by a RELEASE_BUFFER command issued by external equipment 40 to online monitor 10 via the fieldbus 38. When DCM is set to a logic 0, the system is in the LAST capture mode. In this mode, if all buffers are presently in use when a new event is triggered, the data capture buffer containing the oldest data is cleared and reused to store the new data.

The Mode bits M1 and M0 indicate the four main modes of the On Line Monitor. Table 3 provides the definition of the mode bits in the OLM response status word

TABLE 3

Mode Bits M1 and M0 Definitions
Mode Bits

| M1 | M0 | Mode |
|---|---|---|
| 0 | 0 | System Error |
| 0 | 1 | On Line Monitor |
| 1 | 0 | System Configuration |
| 1 | 1 | Diagnostic |

The four main modes of the online monitor, as described in Table 3 are:

System Error mode, which is declared whenever the online monitor detects a hardware error, On Line Monitor mode, in which the online monitor 10 is actively sampling the analog data channels, detecting events and capturing data, System Configuration mode, in which the online monitor is capable of accepting parametric data in the form of commands from external equipment 40 that determine the operation of the online monitor 10, and Diagnostic mode, which is used for calibration purposes in the manufacturing process.

The online monitor 10 also provides 8 triggerable event types, symbolically labeled ET0–ET7, each configurable via a Define Event command, acknowledged by the online monitor when it is in the System Configuration mode. As discussed previously, Data Capture Events can be initiated via a computed trigger, which occurs when certain logical relations are satisfied between the data channels, or by a forced trigger initiated by a command to online monitor 10 by external equipment 40 via the fieldbus 38. For each event type, a User Event Definition (UEV) structure contains the following information required to specify the computed trigger of an event and the data to be stored when such an event is triggered:

A monitored signal channel number, which can be any of the 12 Real Analog Data Channel numbers.

A threshold channel number, which can be any of the up to 12 Real Analog Data Channel numbers or any of the 16 Virtual Analog Data Channel numbers, A threshold percentage value for event trigger, PCTn, for the nth event defintion.

A Sign Mode specification, which determines whether computed triggers are generated based on the signed values of the signal and threshold channels, (defined as a value of 1) or the absolute values of the signal and threshold channels.

A Logic Type specification which determines whether an event is triggered based on a transition of the signal channel (signed or unsigned as specified by the Sign Mode above), from a transition from the state in which the signal channel value is less than the computed trigger threshold to that in which the signal channel is greater than the computed trigger threshold, or the transition from the condition in which the signal channel (again signed or unsigned as specified by the Sign Mode above) is greater than the computed trigger threshold, to that in which the signal channel is less than the computed threshold.

A hysteresis value, HYSTEREISISn, for the nth event definition, which determines the level of hysteresis applied to the transition from one state to another as will be discussed subsequently, A logic debounce count value, DEBOUNCE COUNTn, for the nth event definition, which determines the number of sequential elementary scans in which a logic condition is satisfied before the online monitor declares the condition to be logically true for trigger purposes, A Real Analog Data Channel mask (RADC mask) that indicates which of the 12 real analog data channels are to be subsequently captured in response to the satisfaction of the logical conditions for a trigger of this event.

A Set Event Enable Mask command issued from external equipment 40 to the online monitor 10 via fieldbus 38 sets the bits in an Event Enable MASK Register which is used by the system to determine which of the eight events are presently enabled for computed triggering of the corresponding event.

Figure 8A:
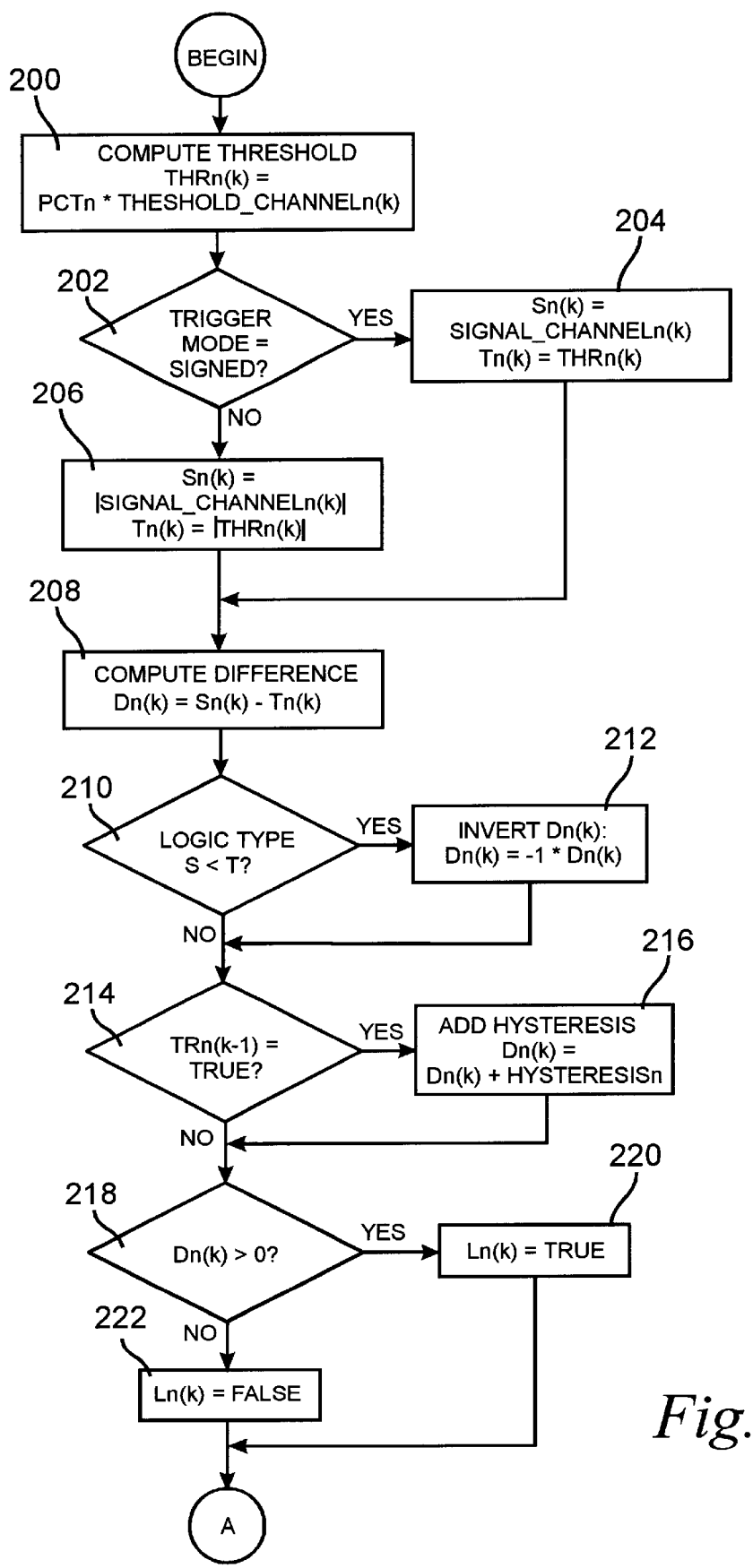
FIGS. 8A, B are a flowchart illustrating the logical process of detecting the beginning of an event.
Figure 8B:
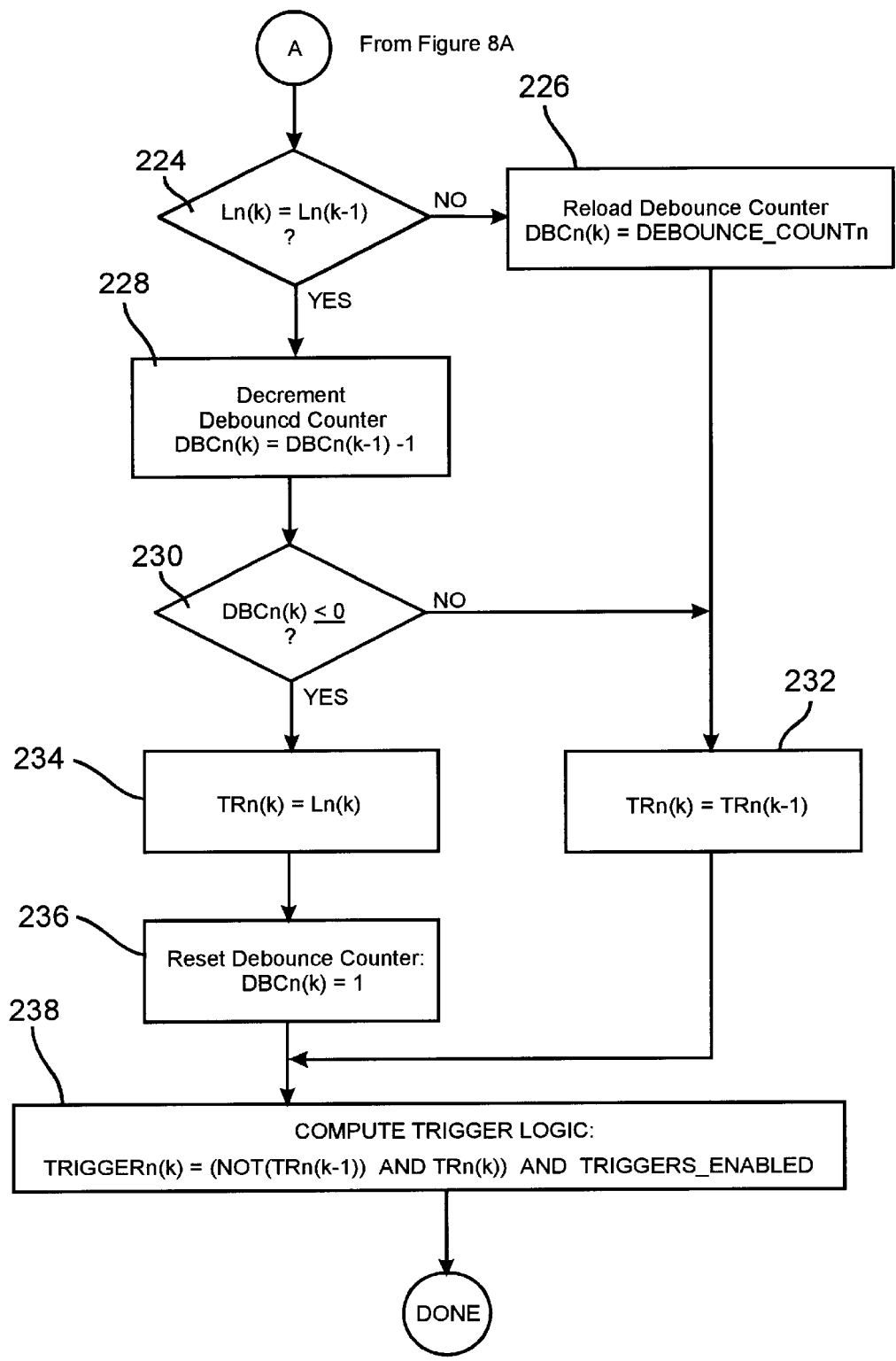

FIG. 8 is a flowchart describing how triggers are computed by the online monitor using the parametric data above. On each elementary scan (which occurs each 200 microseconds) while the online monitor is in the MONITOR mode, the DSP executes the logic described in FIG. 8 for each event enabled as defined by the Event Enable Mask above until either a trigger is detected as described subsequently, or all enabled events have been processed.

Referring to FIG. 8, for the nth event, in 200 the OLM first computes a threshold THRn(k) for this kth elementary scan of the online monitor by multiplying the user defined threshold percentage for event n, PCTn, by the present value of the analog data channel defined by the user defined threshold channel for the nth event, labeled THRESHOLD_CHANNELn(k) in FIG. 8 As described above, the threshold channel may be one of the real analog data channels, or may be one of 16 user definable constants in the event that the user wishes to compute a trigger based on a constant level, as would be the case for instance when detecting a low battery voltage condition. In decision block 202, the DSP 100 determines if the user defined SIGN_MODE is signed or unsigned from the parametric data defining the event. If the value of the SIGN_MODE parameter is SIGNED, in processing block 204 the DSP 100 assigns the actual value of the user defined SIGNAL_CHANNELn(k) in FIG. 8 to a variable Sn(k) and the threshold THRn(k) computed in 200 above to a variable Tn(k). If the value of the SIGN_MODE parameter is UNSIGNED, control transfers to block 206 where the DSP 100 assigns 206 to Sn(k) and Tn(k) the absolute value of the SIGNAL_CHANNELn(k) and THRn(k), respectively.

In processing block 208, the DSP 100 assigns to the difference variable, Dn(k), the signed arithmetic difference between Sn(k) and Tn(k), according to:

$$Dn(k)=Sn(k)-Tn(k) \tag{1}$$

In decision block 210, the DSP 100 examines the value of the TRIGGER_TYPE parameter for the event. If the value of the TRIGGER_TYPE parameter is S<T, in processing block 212 the DSP changes the sign of Dn(k) by multiplying it by −1.

Next hysteresis is applied to signals as required to reduce the effects of electrical and other noise on slowly varying signals. Without hysteresis, it is often impossible to detect a clean transition from one logical state to another. The effect of hysteresis is as follows. An internal trigger state variable, for the nth event, TRn(k), is maintained by the trigger manager in a manner to be subsequently described. This variable takes the logical states TRUE or FALSE. Once the DSP 100 has declared the logical state of TRn(k) to be TRUE, the difference Dn(k) computed according to blocks 208, 210 and 212 must be more negative than the hysteresis value before the DSP 100 will declare the logical state of the TRn(k) for that event to be FALSE.

In decision block 214, the DSP 100 determines if the previous state of the trigger for the nth event, TRn(k-1),k is TRUE. If so, in processing block 216, the DSP 100 modifies the value of Dn(k) by adding the value of the HYSTERESIS parameter for this event to Dn(k), according to:

$$Dn(k)=(Dn(k)+[HYSTERESIS]n \tag{2[1]}$$

and passes control to decision block 218. If the previous value of TRn(k-1) is logic FALSE, no hysteresis is applied and control passes directly to decision block 218. If at decision block 218, the value of $D_h(k)$ is greater than zero, in process block 220, the instantaneous logical value of the comparison between the signal and threshold (with hysteresis), Ln(k) is declared TRUE. Otherwise, in process block 222, Ln(k) is declared FALSE. A debouncing method is then employed to determine the value of the internal trigger state for this event, TRn(k), in which the value Ln(k) must have the same logical state for a number of sequential elementary scans before the internal trigger state TRn(k) can change. The number of sequential elementary scans is user defined for the event by means of a DEBOUNCE COUNTn parameter. To accomplish this, in decision block 224, the present value of Ln(k) is compared against its previous value, Ln(k-1). If they are not equal, in processing block 226, the DSP 100 loads the debounce counter for this event, DBCn(k), with the user defined parameter value for this event, DEBOUNCE_COUNTn. Control transfers to process block 232, the function of which will be described subsequently. If in decision block 224 the instantaneous logical value Ln(k) and the previous instantaneous logical value Ln(k-1) are determined to be equal, in processing block 228 the DSP 100 decrements the value of DBCn(k). At decision block 230, if the value of the debounce counter, DBCn(k) is greater than zero (after decrementation in process block 228), control transfers to process block 232, where TRn(k) is assigned the previous vlaue, TRn(k-1). Note that process block 232 can also be reached from process block 226 as described above. Following process block 232, control is passed to process block 238, to be described subsequently.

If in processing block 230 the debounce counter value DBCn(k) is less than or equal to zero, it is acceptable to change the processed trigger state value, TRn(k). In process block 234, TRn(k) is assigned the value Ln(k) computed above. Following this, the DSP 100 "resets" the debounce counter DBCn(k) to a value of 1 in process block 236, ensuring that this process will be repeated on each elementary scan so long as Ln(k−1) and Ln(k) are equal. Control then passes to process block 238.

In process block 238, the DSP 100 determines whether the actual trigger condition is satisfied and a capture should be initiated. The variable TRn(k) defines whether the logical conditions for initiation of a data capture are met. A data capture may be initiated only when the previous internal trigger state, TRn(k-1) was FALSE and the newly computed trigger state, TRn(k) is TRUE. In process block 238, the logical value of the trigger, TRIGGERn(k) is computed according to TRIGGERn(k)=(NOT(TRn(k-1)) AND TRn(k)) AND TRIGGERS ENABLED (3)

where TRIGGERS_ENABLED is a logical variable maintained by the DSP 100 that determines whether the DSP 100 will recognize a trigger, (when set TRUE), or ignore a trigger (when set FALSE). ──NOT and AND denote the operations of logical negation and conjunction, respectively. Once TRIGGERn(k) is computed in 238, the processing of the trigger for event n is complete for the present elementary cycle.

As disussed previously, a FORCE TRIGGER EVENT command is provided to permit the external equipment 40 to force the triggering of any event. External Triggering of an event also overrides the Event Enable Mask, allowing any event type to be force triggered.

The DSP Base Unit 14 does not support logging of simultaneous events. If the conditions for an event trigger are satisfied while the system is busy logging another event, the event is ignored. In the event that the trigger requirements for two events are simultaneously satisfied on the same elementary scan, the lowest event number will be triggered and data captured. When an event is triggered, by either computed or forced trigger, and providing Event Capture Data Buffer is available, the online monitor 10 will gather data required to generate an Event Data Capture Buffer Status, to be defined subsequently, and up to 5 channels of data as defined by the RADC Mask defined for the event type. It will then store this data in the Event Capture Data Buffer. On this and subsequent elementary scans, the DSP 100 will store the values of the up to 5 channels of data as defined by the RADC Mask defined for the event type until the event capture is complete.

An individual Event Data Capture Buffer is organized as two data fields, a Data Capture Buffer field, and an Event Data Capture Buffer, which provides summary information about the data in the Event Data Capture Buffer. Table 4 below shows the format of the Status field that is stored in the Event Data Capture Buffer. A Status field comprises 13 integer words of data.

TABLE 4

| Event Data Capture Buffer Status Buffer Word | | | | | | |
|---|---|---|---|---|---|---|
| 0 | 1 | 2 | 3–9 | 10 | 11 | 12 |
| Status | Previous Buffer | Next Buffer | Time of Capture | RADC Mask | Data Checksum | Status Checksum |

The following describes the significance of the structures in a Status field:

The Status word, (word 0) is a copy of the corresponding ECBR described above. It is placed in the status buffer so that it will be preserved when power is removed from the online monitor and the event capture memory is under battery power.

The Previous Buffer and Next Buffer fields (words 1 and 2 in Table 4) are pointers to the previous buffer and next buffer in a linked list of buffers. These fields are required so that the DSP 100 can maintain the order in which data was captured, and because external equipment make any buffer available for capturing data by means of a Release Data Buffer Command. In the Event Capture Data Buffer containing the oldest data in the chain, the Previous Buffer field points to the buffer number itself. In the Event Data Capture Buffer containing the most recent data, the Next Buffer field points to the buffer itself.

The Time of Capture field comprises 7 words of data that represent the time at which the event was triggered.

The RADC Mask field contains the RADC mask from the User Event structure (UEV per above) that triggered the event.

The Data Checksum field contains a longitudinal redundancy check applied to the Data Capture field.

The Status Checksum field contains a longitudinal redundancy check applied to the Status field.

The Data Buffer field of an Event Data Capture Buffer contains the actual data saved during an event. When an event is triggered, the DSP 100 stores samples of 5 Capture Data Channels of information in the Data Buffer for a total number of 3232 samples. This corresponds to 32 samples of the 5 Capture Data Channels of information prior to the trigger, corresponding to 6.4 mS prior to the trigger, followed by 3200 samples of the selected 5 Capture Data Channels of information, corresponding to 640 mS of data, following the trigger. The numbers 3232 were selected by a specified online monitor 10 application requirements, whereas the 5 Capture Data Channels of information are limited by the memory available within a Capture.

DSP 100 maintains the event log buffer 124 that keeps a count of the total number of trigger events of a specific type that have occurred since an application has been commissioned. The event log 124 is stored in a non-volatile memory such as a flash EEPROM. In operation, the external equipment 40 can, at any time, query the Event Log to obtain the number of events since commissioning. By taking the difference between the event log values from one query to the next, the total number of occurrences of a specific event since the last query can be determined. Thus a single Event Log can be used to estimate the "rate" of occurrence of a particular event, as well as to ascertain the total number of occurrences of a particular event since the online monitor 10 was commissioned. Assuming the online monitor 10 is commissioned when a machine or process. is installed, the online monitor 10 maintains the log of events for a specific application. This function is different from the Event Capture Buffers. The Event Capture Buffers capture detailed data from a small number of the most recent occurrences of all events. The Event Log captures the total number of occurrences of each event, without the details. Because of the Last In—First Out nature of the Event Capture Buffer function, the data from the most recent events can be captured and reviewed.

The online monitor 10 provides the time of day clock 118 with an optional mechanism to permit synchronization with an external time base source, such as a GPS device. When enabled, the function queries the external time base mechanism at a user specified rate, and updates its internal real time clock 118 with the information obtained from the external device. Allowing a "resynchronization" at a fixed rate allows the online monitor 10 to operate exactly the same in all other aspects. A direct query to the external device on the serial communication port 120 of the DSP ring 16 provides the communication method between the DSP ring 16 and the time base source. Logging of data takes priority over communication with the External Clock.

Numerous other commands are available to permit external equipment 40 to control the operation of online monitor 10 via the fieldbus 38. A system RESET command permits the external equipment 40 to reset the online monitor 10 hardware.

An ANALOG_DATA_SNAPSHOT command causes the online monitor 10 to wait until the end of a present elementary scan. A Time Tag is generated for the command. Once the present Analog Data Scan has completed, the system transfers the result of the Analog Data Scan to the corresponding Analog Data Snapshot Buffer registers. Both Virtual and Real Analog Data values are copied into the Analog Data Snapshot Buffer (ADSB) registers. The online monitor 10 places the value of the Time Tag in a Response Data Buffer. Return of this data permits external equipment 40 to time tag the contents of the ADSB.

Register commands provide commands to permit the external equipment 40 to examine and modify the contents of the internal data and parameter registers of the online monitor 10. Upon receipt of a valid READ_DATA_REGISTERS command, the online monitor 10 immediately copies the present value of all data registers specified by the command to the ATI interface. 36. In response to a correctly formatted WRITE_PD_REGISTER BLOCK command, the online monitor 10 writes the requested data. The values returned are in the Response Data Block to external equipment 40 via the fieldbus 38 are copied from the registers after completion of the command execution. In certain instances, the value of a parameter is critical to operation of the application and may be a function of the value of other parameters. For this reason, certain blocks of registers are defined as "read only." The "read only" status refers to access of the registers using the WRITE_REGISTER_BLOCK command. In cases where consistency checks are required, a command is provided that permits the block of data to be modified after consistency checks are performed.

The Event Capture Buffer commands include a READ_EVENT_STATUS command which permits the external equipment 40 to read the statistics of an active event buffer, including the RADC mask value which defines which of the 12 channels is stored in a data point. The online monitor 10 incorporates a READ_DATA_POINTS command to permit the external equipment 40 to request data points from a specified Event Data Capture Buffer. The command allows external equipment to specify the beginning data point and the number of data points to be transferred in the response to the command. Up to five data points may be read using a single command.

The online monitor 10 incorporates a RELEASE_BUFFER command that permits the external equipment 40 to tell the online monitor 10 that it is finished with a given data buffer and that the physical buffer can be de-allocated to store other events.

Clock commands are provided to accommodate the real-time clock 118. The online monitor 10 accommodates a command to permit the external equipment 40 to explicitly set the time of the real-time clock 118 using a SET_CLOCK command. Assuming the SET_CLOCK command is correctly issued, the online monitor 10 returns the data into the Response Data Block for subsequent return to the external equipment 40. The online monitor 10 also provides a READ_CLOCK command to permit the external equipment 40 to explicitly read the time of the real-time clock 118.

Synchronization of the real-time clock 118 with an external clocking system (such as a GPS) via the serial communication port 120 is permitted by a ECLOCK_SYNC_ON command. Upon encountering the command, the online monitor 10 internally enables synchronization with the external clock. Immediately upon receipt of the ECLOCK_SYNC_ON command, the DSP ring 16 attempts to communicate with an external time base device and if successful, immediately synchronizes its internal clock with that device. The success or failure of synchronization is indicated by the CSS bit in SR1. The online monitor 10 also provides a command to permit the external equipment 40 to disable synchronization of the real-time clock 40 with an external clocking system (such as a GPS). Upon encountering the ECLOCK_SYNC_OFF command, the online monitor 10 terminates communication with the EXTERNAL TIME BASE DEVICE. The CSS bit in SR1 is immediately cleared when the ECLOCK_SYNC_OFF command is received and processed.

Event log commands allow the external equipment 40 to access and manipulate the contents of an event log 124 entry via the ATI interface 36. When the online monitor 10 encounters a READ_EVENT_LOG command, on the next available ATI scan, it returns a READ_EVENT_LOG command identifier, an ERROR code, the event number, EVENTNUM, and the value of data contained in the event counter EVENTNUM, EVENTDAT(EVENTNUM). Clearing the event log is accomplished via a CLEAR_EVENT_LOG command issued by external equipment 40 to online monitor 10 via fieldbus 38. Since this command destroys the event log data, the CLEAR_EVENT_LOG command should only be enabled via commissioning in certain applications.

The DSP 100 application programs comprise a foreground task and a background task. The foreground task contains those software processes that are not time critical, such as system initialization and processing of commands received from the external equipment 40 via the fieldbus 38 through ATI fieldbus 36. The background task contains those processes necessary to maintain a high speed sampled data system, such as digital signal processing of analog signals, executing the logic required to determine if the conditions necessary for a trigger to be declared are met, capturing data and updating the real time clock 118.

Figure 9:
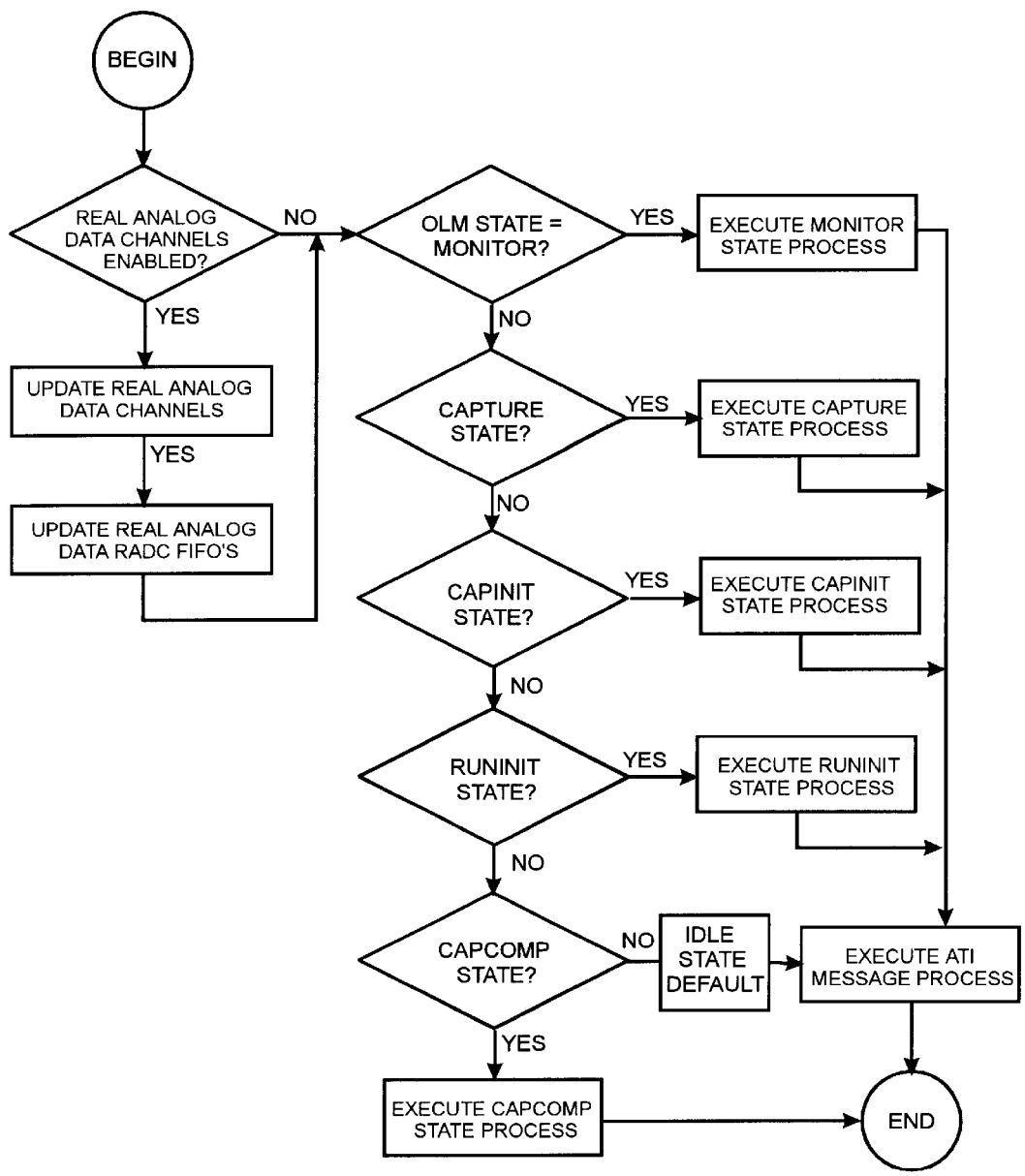
FIG. 9 is a data flow chart depicting a background task for the online monitoring device according to the present invention.

FIG. 9 shows a flowchart of the background task, which is normally executed on receipt of an interrupt signal from one of the timers integral to the DSP 100. In the preferred embodiment, this interrupt normally occurs each 200 microseconds This 200 microsecond interval is the elementary cycle referenced previously. Upon entry to the background task, the DSP 100 first processes indicator LED states, turning on and off the indicator LED's. Once the LED states have been updated, a test is made as to whether the real analog data channels should be processed. This test is based on a software semaphore, RADC_ENABLED. Assuming RADC_ENABLED is in the logic true state, each analog input is sampled and filtered and an affine transformation applied to generate an integer number representative of the intended interpretation of the analog signal sampled for that channel, in accordance with the method described by FIG. 6.

Once the real analog data channels have been updated, the RADC first-in-first-out (FIFO) buffers are updated for each channel. The FIFO buffers serve two purposes in the online monitor 10. First, it is recognized that some operations to be described subsequently cannot be executed by the DSP 100 within one elementary cycle. In most applications, the external events that caused the online monitor 10 to trigger and begin to capture data are of as much of or more interest to the end user than those subsequent to the trigger. Second, the FIFO delay line buffer provides the online monitor 10 the ability to save a short interval of pre-trigger data prior to the trigger.

After the RADC FIFO buffers have been updated per above, or if the real analog data channels have been disabled, the background task determines in which of six states the OLM is intended to be operating, namely: MONITOR state, CAPTURE state, Capture Initialization (CAPINIT) state, Run Initialization (RUNINIT) state, Capture Complete (CAPCOMP) state, and IDLE (no background processing) state. Details of the processing in each state is dependent upon the specific state. Once DSP 100 has performed the processing specific to the intended state of the online monitor 10, in all cases except the CAPCOMP state, the DSP 100 attempts to read a message from the ATI interface 36, if one is available.

Figure 10:
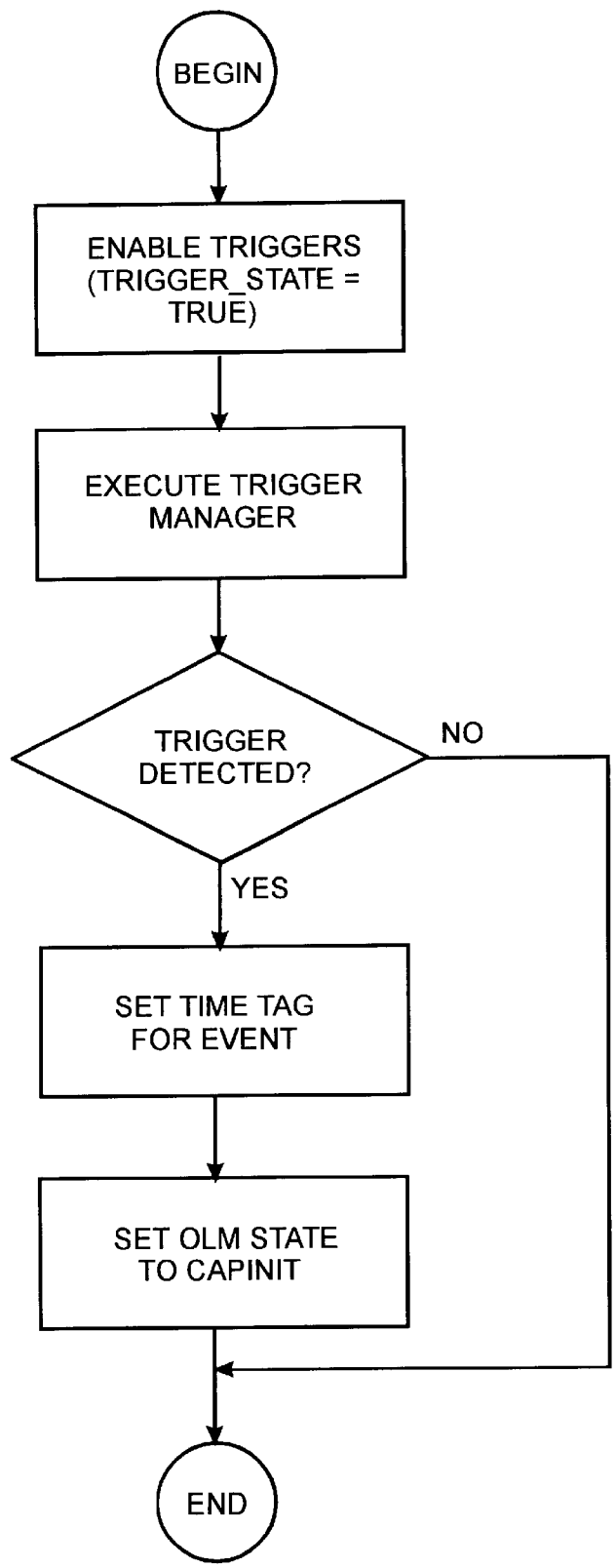
FIG. 10 is a flowchart describing the function of a Monitor state process, for the online monitoring device according to the present invention.

FIG. 10 describes the function of the Monitor process, which executes each elementary scan when the background task of the online monitor is in the MONITOR state. The online monitor 10 first enables the triggers by setting the TRIGGERS_ENABLED flag true. It then calls the TRIGGER MANAGER function, which executes the logic described in FIG. 8 and described in detail earlier for each event defined by the Event Enable mask to determine if the conditions for an event trigger are satisfied. If a trigger is detected via this process, the online monitor 10 immediately sets the time tag for the event in the real time clock and sets the background task state to CAPINIT, so that on the next elementary scan, the online monitor 10 will perform the necessary preparation to capture the data.

Figure 11:
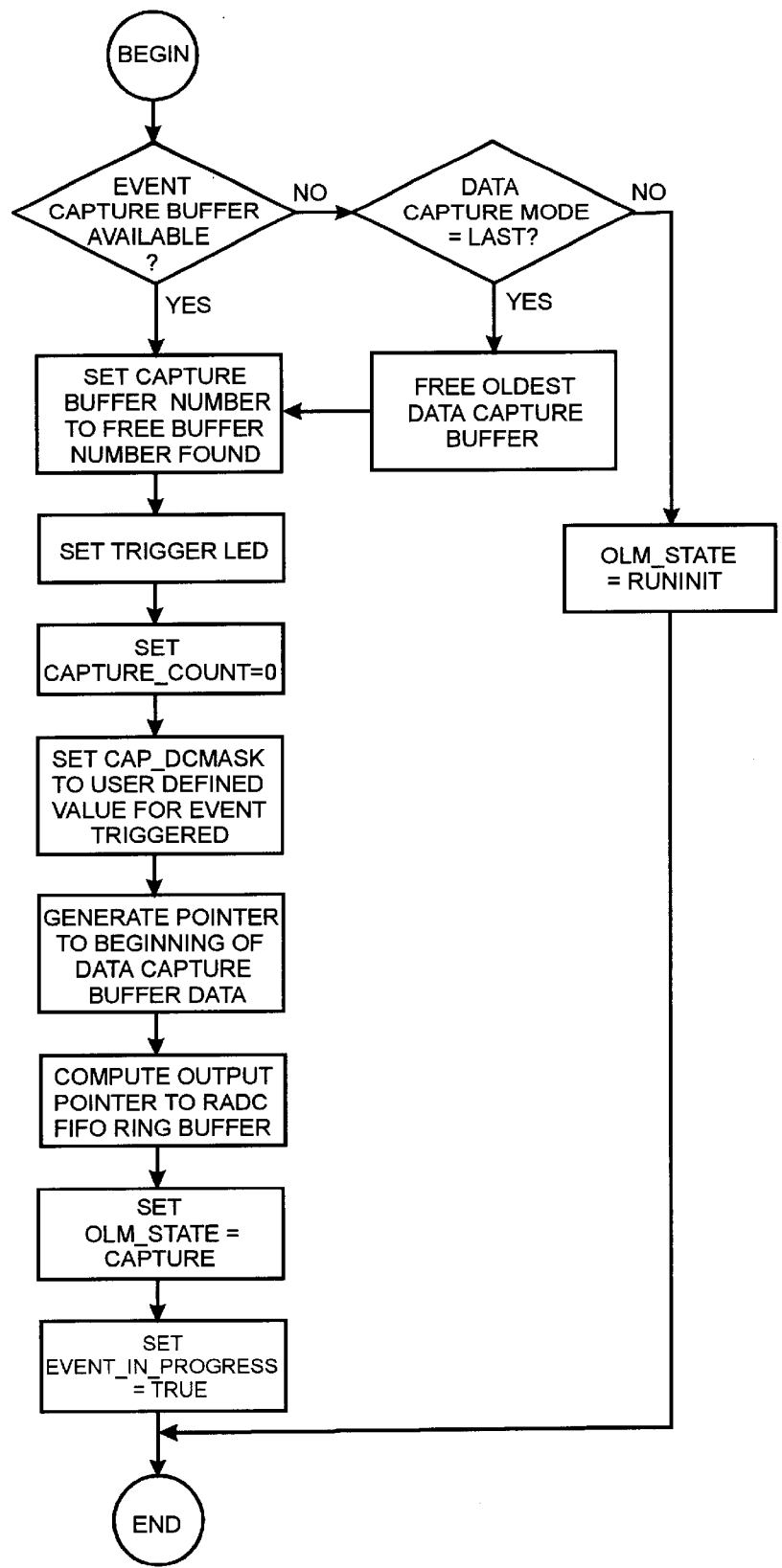
FIG. 11 is a flowchart describing the function of a Capture Initialization state process, for the online monitoring device according to the present invention.

FIG. 11 describes the function of the CAPINIT state process. The (CAPINIT) STATE process executes in one elementary scan when the background task is in the CAPINIT state. As explained previously, the background task is placed in the CAPINIT state to perform the processing required to accept the data to be captured. Since the online monitor 10 contains a finite number of data capture buffers (32 in the preferred embodiment), the background task first determines whether there is a data capture buffer available to accept the data from the event. If no capture buffer is available and the online monitor 10 has been placed in a FIRST mode via programming by external equipment, the online monitor _STATE variable is set to the RUNINIT state for processing on the next elementary scan. If there is no capture buffer available, and the online monitor 10 has been placed in the LAST mode via programming by external equipment, the background task releases the data capture buffer containing the oldest data to accept the new data. Next, the background task turns on the trigger LED, signifying that the online monitor 10 is in the process of capturing data. The background task initializes a counter, CAPTURE_COUNT, which keeps track of the number of data points that have been captured.

Only one event can be captured by the online monitor 10 at a time, specified by the trigger that was satisfied. In the CAPINIT state, the background task copies the data capture mask that specifies which of the real analog data channels are to be captured into a local data capture mask DCMASK. Next, a pointer into the data capture buffer is initialized to the beginning of the data section of the data capture buffer so the background task need not compute a new pointer as it captures data in subsequent elementary scans.

To ensure data integrity and to provide a mechanism to determine which of the 32 battery backed data buffers contain valid data, a modulo $2^{16}$, two's complement checksum is provided for both the Data Buffer and Status Buffer of each Event Data Capture Buffer. The checksum for the Data Buffer is initialized by the background task in the CAPINIT state and is updated on each elementary scan while capturing data.

The RADC FIFO buffers are implemented as circular buffers. A pointer to the input location of the circular RADC FIFO-buffers is computed at the beginning of the background process. In the CAPINIT state, the location of the output point of the circular RADC FIFO buffers is computed based on the length of the pretrigger interval and the latency of the processing required to configure the background task for the capture. In this case, two elementary scans, one when the trigger was actually detected, and one for this elementary cycle in which the CAPINIT processing takes place.

Once this processing is complete, the background task sets the OLM _STATE variable to CAPTURE sets an EVENT IN PROGRESS flag and the CAPINIT state process is complete.

Figure 12:
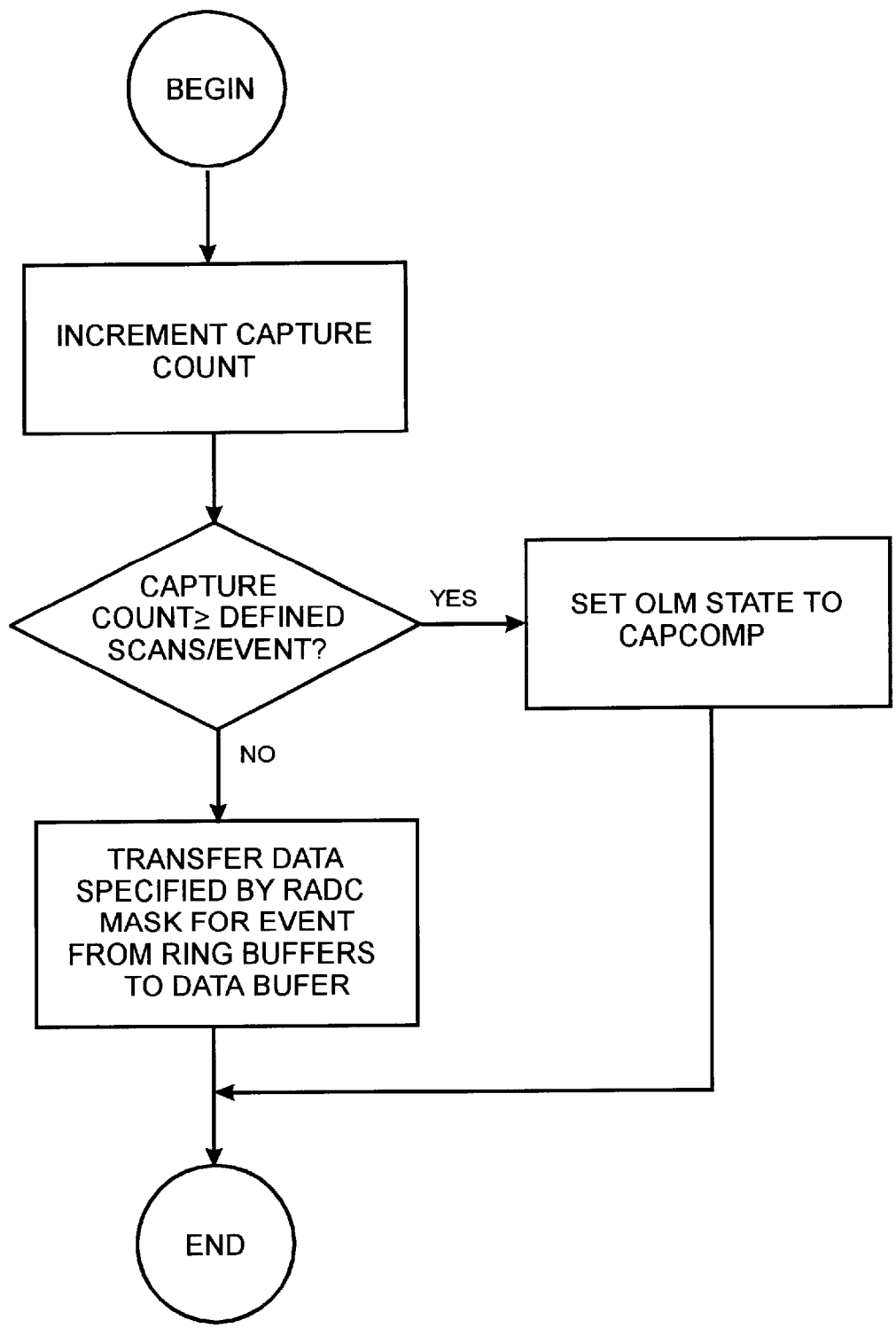
FIG. 12 is a flowchart of a Capture state process that executes on each elementary scan for the online monitoring device when it is in the capture state according to the present invention.

FIG. 12 is a flowchart of the CAPTURE state process that executes on each elementary scan when the background task is in the CAPTURE state. First, the DSP increments the CAPTURE_COUNT counter variable, which keeps track of the number of data points captured. If the value of the CAPTURE_COUNT variable is equal to or exceeds the defined elementary scans per event (3232 in this case), the OLM _STATE variable is set to CAPCOMP (for CAPture COMPlete).

Assuming the value of the CAPTURE_COUNT counter does not exceed the predefined number of elementary scans per event, the background task proceeds to transfer the values of the RADC channels specified in the DCMASK variable from the output of the RADC FIFO buffers into the data section of the presently selected data capture buffer. In the present implementation, each data point comprises exactly 5 channels of data. The foreground task will not accept a datacapture mask with greater than 5 channels specified. If fewer than 5 channels of data are specified by the DCMASK, the background task sets the extra channels to a value of zero, so that exactly five integer words of data are written to the selected data capture buffer on each elementary scan while the OLM is in the CAPTURE state. The embodiment described here was implemented in this manner for convenience and this should not be construed as a limitation of the invention. In particular, implementations in which the number of analog data channels is variable, and the length of capture is a function of the available data buffer memory can readily be envisioned. Following the transfer of data to the data capture buffer, or the setting of the OLM_ STATE variable to CAPCOMP as described above, processing is complete for this elementary cycle.

Figure 13:
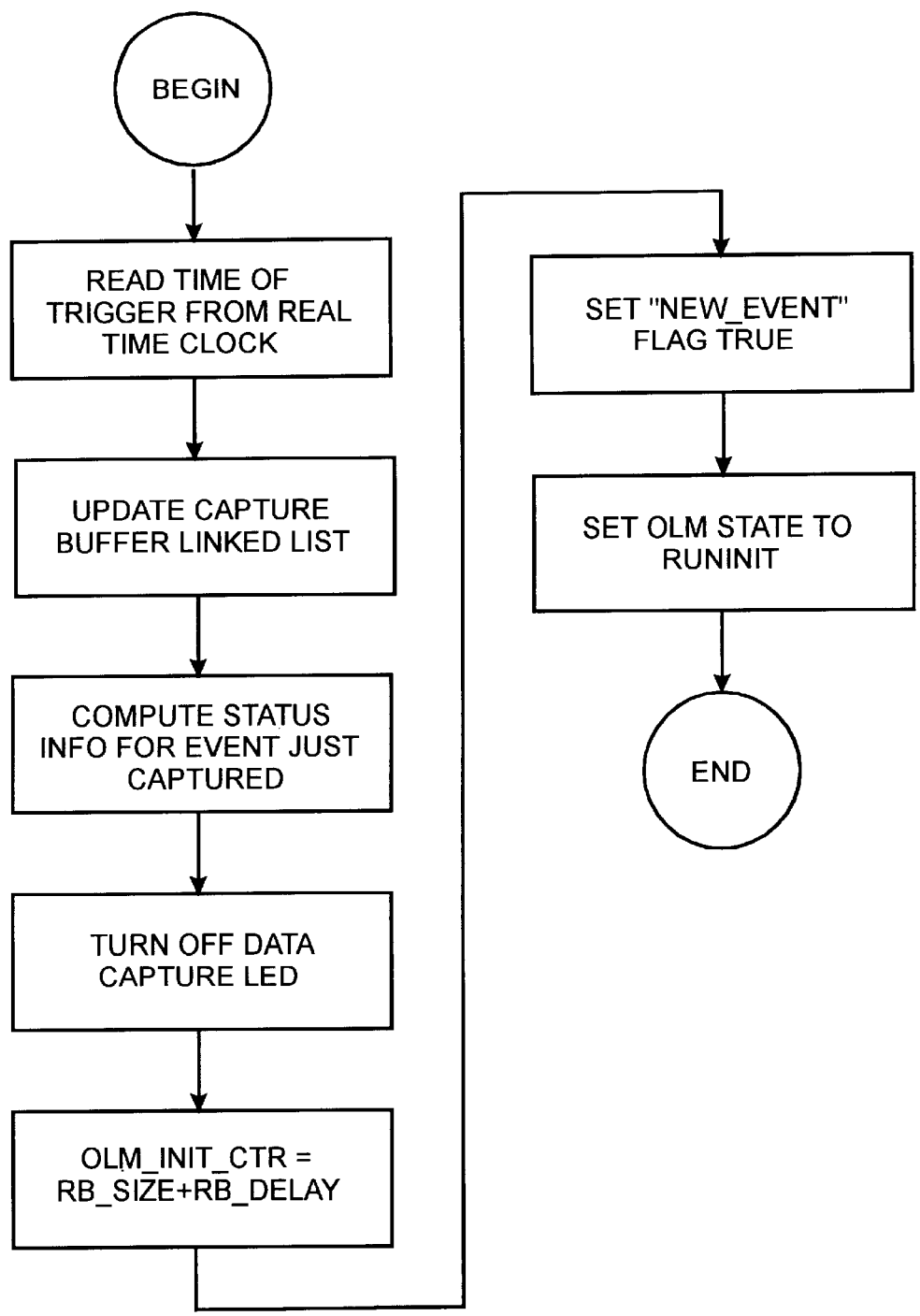
FIG. 13 is a flowchart of the for a Capture Complete state process for the online monitoring device when it is in the capture state according to the present invention, which executes at the end of a data capture.

FIG. 13 is a flowchart of the for a CAPCOMP state process which executes at the end of a data capture. In the present implementation, the CAPCOMP state process does not execute within the time allotted in an elementary scan. Since there is no requirement to sample data or capture data while this process is executing, the background task ignores subsequent requests for elementary scans while the CAPCOMP state process is executing. In the CAPCOMP state, the background task is completing the transfer of data into the data capture buffers and is updating the status of the system to reflect that new data is available. The first activity in this process is to read the time of the trigger from the real time clock 118. Recall that this time was set by the time tag issued when a trigger was detected while the background task was in the MONITOR state described above. The time of trigger retrieved from the real time clock 118 is stored in the Status field of the selected Event Data Capture Buffer as described previously. Next, the background task updates the Previous Buffer and Next Buffer fields of the Status field as described earlier.

Following the update of the linked list, the background task enters several parametric values into the Status field of the Event Data Capture Buffer presently selected. The number of the event that caused the trigger and for which data is captured is stored in the buffer, as well as the value of DCMASK determined in the CAPINIT state described above. This is done because the OLM presently allows an event to be re-programmed while there is data in the data capture buffer from its previous definition. The value of the checksum for the Data field of the Event Capture Data buffer is stored in the Status field as described previously. The data age of the buffer, which indicates which buffer in the chain is represented by the presently selected hardware buffer is also stored in the Status field. The data age of the buffers ranges from 0 (the oldest) to one less than the number of data capture buffers presently containing valid data (indicating the newest).

Once all of this data has been entered into the Status field, the checksum field of the Status field is set to zero, a 2's complement, modulo $2^{16}$ checksum is computed for the Status field and that value is entered into the checksum field of the Status field, so that if each value in the Status Buffer is summed module $2^{16}$, the result should be zero.

After the above processing is complete, the background task turns the trigger LED indicator off to show visually that the OLM 10 is finished capturing the event triggered. A counter, OLM_INIT_CTR, is loaded with a value equal to the maximum length of an RADC FIFO buffer plus a delay value (of two in this case). This counter will be used by the RUNINIT process to be described subsequently, The background task then sets the $OLM_{13}STATE$ variable to RUNINIT and the CAPCOMP process is complete.

Figure 14:
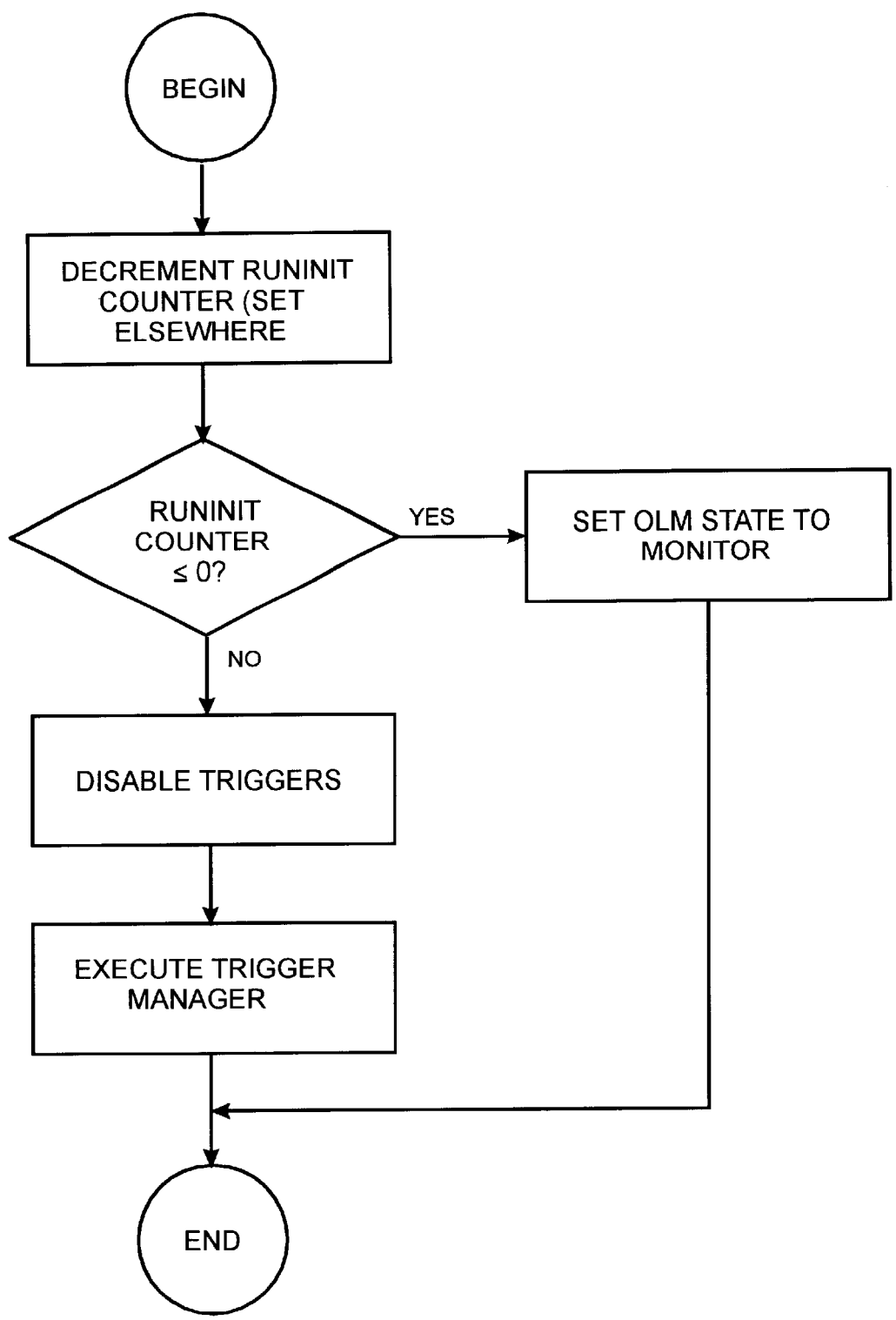
FIG. 14 is a flowchart of a Runinit state process function for the online monitoring device according to the present invention.

The purpose of the RUNINIT state is to initialize the RADC FIFO buffers and to permit the trigger manager function to initialize it's state variables prior to allowing the OLM return to the MONITOR state. FIG. 14 is a flowchart of the RUNINIT state process that is executed in each elementary scan while the OLM is in the RUNINIT state. The OLM_INIT_CTR counter was initialized previously, either by the foreground task or by the CAPCOMP state processor defined above. The first action taken by the RUNINIT state processor is to decrement the OLM_INIT_CTR counter. If the resulting value is less than or equal to zero, the background task sets the OLM_STATE variable to monitor and exits. Assuming the result of decrementing the OLM_INIT_CTR is a value greater than zero, the background task disables the generation of triggers, but executes the trigger manager to permit the trigger manager state variables to become initialized. Once the trigger manager function has been executed, the RUNINIT state processor is complete for the present elementary scan and flow returns to the process described in FIG. 9.

Once the background task has executed the appropriate state process as described above in FIG. 9, note that, with the exception of the CAPCOMP state, or if the online monitor 10 is in the IDLE state, the ATI message process is executed to determine if a message exchange between the fieldbus communication adapter 28 and the DSP Ring 16 is appropriate. If an exchange is warranted, the background task performs the exchange and then returns control to the foreground task. In the CAPCOMP state, the ATI message process is not executed in order to provide more time for the CAPCOMP state process to execute.

FIG. 15 A,B,C is a flowchart showing the processing that is performed by the foreground task, that is, when the DSP 100 is not busy processing the time critical elements of the sampled data system. On power up, the foreground task performs the system initialization required to configure the DSP 100 outputs, inputs, memory and other components to perform the task at hand, including setting up the time base required to generate an interrupt every 200 microseconds so the background process can run. It then initializes the many variables required in the process. Included in these, the foreground task sets two flags, ROMININT and RAMINIT to a logic true state. It also sets the OLM_STATE background task state variable to the IDLE state, which is used by the background task and the MODE state variable to the COLD_OLM _INIT state, which is used extensively by the foreground task.

After the system is initialized, and at the point labeled "A" in FIG. 15, the background task checks the value of the ROMINIT flag. If the ROMINIT flag is set to a logic TRUE condition, the DSP 100 examines the serial EEPROM located on the DSP Base Unit 14. The EEPROM located on DSP Base Unit 14 is expected to be configured with a two's complement, modulo $2^{16}$ checksum such that if the value of each memory location in the base serial EEPROM is accumulated modulo $2^{16}$ the result of the accumulation will be identically zero. Of course a completely empty. EEPROM, with all values equal to zero will exhibit this behavior, so the foreground task checks for that condition explicitly. If the base EEPROM does not contain valid data, the online monitor 10 should not process data. The foreground task sets the system error flag, labeled SYSERR to a true state, and sets the error code, labeled ERROR in FIG. 15 to indicate that the base EEPROM is corrupted. It also sets the foreground task MODE to SYSTEM_ERROR.

Assuming the EEPROM on the base passes these tests, the foreground task reads the values contained in the EEPROM and determines which of the 12 analog inputs are supported by the DSP Base Unit, and reads the calibration constants contained therein. The data included in the EEPROM for each physical channel supported by the online monitor 10 includes:

a flag that indicates whether the DSP Base Unit 14 contains support for the given physical analog channel, a units code that indicates what the channel is measuring, i.e. volts, millivolts, degrees Centigrade, etc., a calibration gain constant, determined during calibration of the base and used by the background task, a calibration offset constant, determined during calibration of the base and used by the background task, a Real Analog Data Channel minimum expected value for the channel, a Real Analog Data Channel maximum expected value for the channel, and a Real Analog Data Channel scale factor for the channel. The Real Analog Data Channel values are always represented as integers. When the instantaneous Real Analog Data Channel value is divided by the scale factor, the resulting floating point number represents the actual value of the data.

A Real Analog Data Channel resolution number. This number, when divided by the scale factor above, indicates the designed resolution of the channel.

A Real Analog Data Channel accuracy number. This number, when divided by the scale factor above, indicates the designed accuracy of the channel.

A Configuration flag, indicating whether the channel represented measures a quantity on the base, such as base temperature or power supply voltage, or represents a quantity that can be connected to an external sensor.

An input type flag indicating whether the channel represented is a single ended channel, referenced to a common point on the base, or a differential channel which contains its own reference terminal.

Assuming the DSP Base Unit 14 serial EEPROM was not corrupted and once the foreground task completes the task of initializing the variables required to process the analog inputs, the foreground task then tests the EEPROM located on the DSP ring 16. This EEPROM also contains a two's complement, modulo $2^{16}$ checksum to indicate the integrity of the data contained within. If the data in the EEPROM on the DSP ring 16 is determined to be corrupt, the foreground task sets the SYSERR flag to the true state, sets the ERROR variable to indicate a corrupt on-board EEPROM and sets the MODE state variable to SYSTEM_ERROR.

Assuming the EEPROM contains valid data as determined from the checksum, the foreground task proceeds to copy the values contained in the EEPROM into the working definitions of the events and other system configuration variables. These include items such as whether the online monitor 10 is to operate in the FIRST mode, or the LAST mode. In the First mode, the first 32 events are captured, and then data capture stops until a data capture buffer is explicitly released by a command from the fieldbus. In the LAST mode the most recent 32 events are maintained, throwing out the oldest data when a new data capture buffer is needed and all are full.

Assuming both EEPROMs have tested good, the foreground task then checks to see if the RAMINIT flag is set. If it is, the foreground task checks the Data Capture Buffer and Status Buffer of each Event Data Capture Buffer to determine if it contains data from a valid event capture, using the checksums described earlier to determine data integrity. Using the checksums and the data contained in the status buffer, the foreground task configures the buffers into a linked list, so that it and the background task can rapidly determine the order in which the data buffers are utilized, as well as which data buffers are available to capture data.

Once the foreground task has tested and configured the data capture buffers per above, it reads the status of the real time clock 118, including an indication as to whether the clock 118 has been set since it was last reset by a change of clock battery. This information can then be communicated to external equipment on demand using the fieldbus 38. The foreground task then explicitly sets the SYSERR flag to a logic FALSE condition.

When the above initialization processing has been completed, the foreground task tests the result of the SYSERR flag to determine how to proceed. Assuming all system tests have passed normally (SYSERR FALSE), flow proceeds to the flowchart in FIG. 15B at the point labeled "b." If there is a system error (SYSERR=TRUE), flow proceeds to the flowchart in FIG. 15C at the point labeled "c."

Figure 15A:
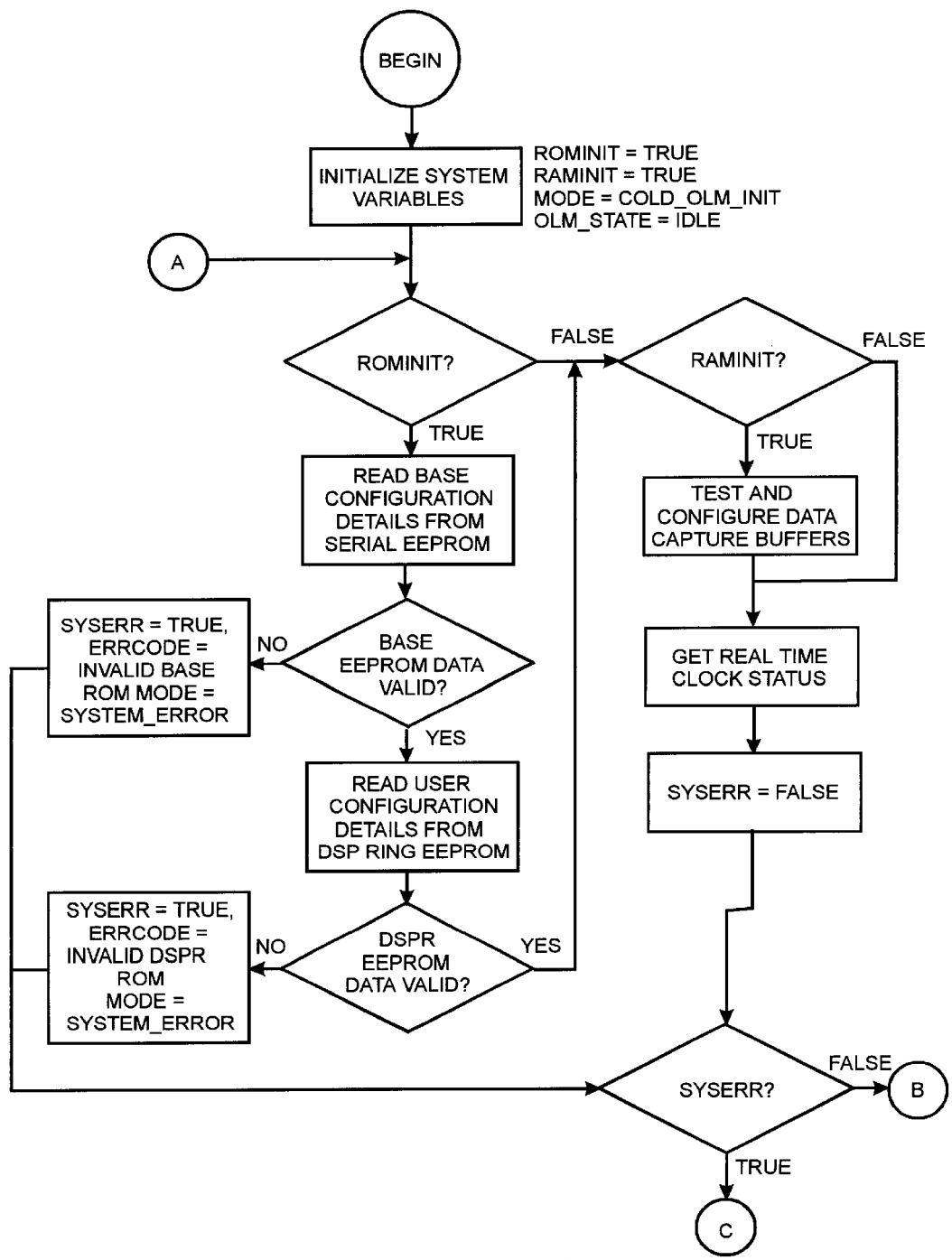
FIGS. 15A, B, C are a flowchart showing foreground processing that is performed in the online monitoring device according to the present invention.
Figure 15B:
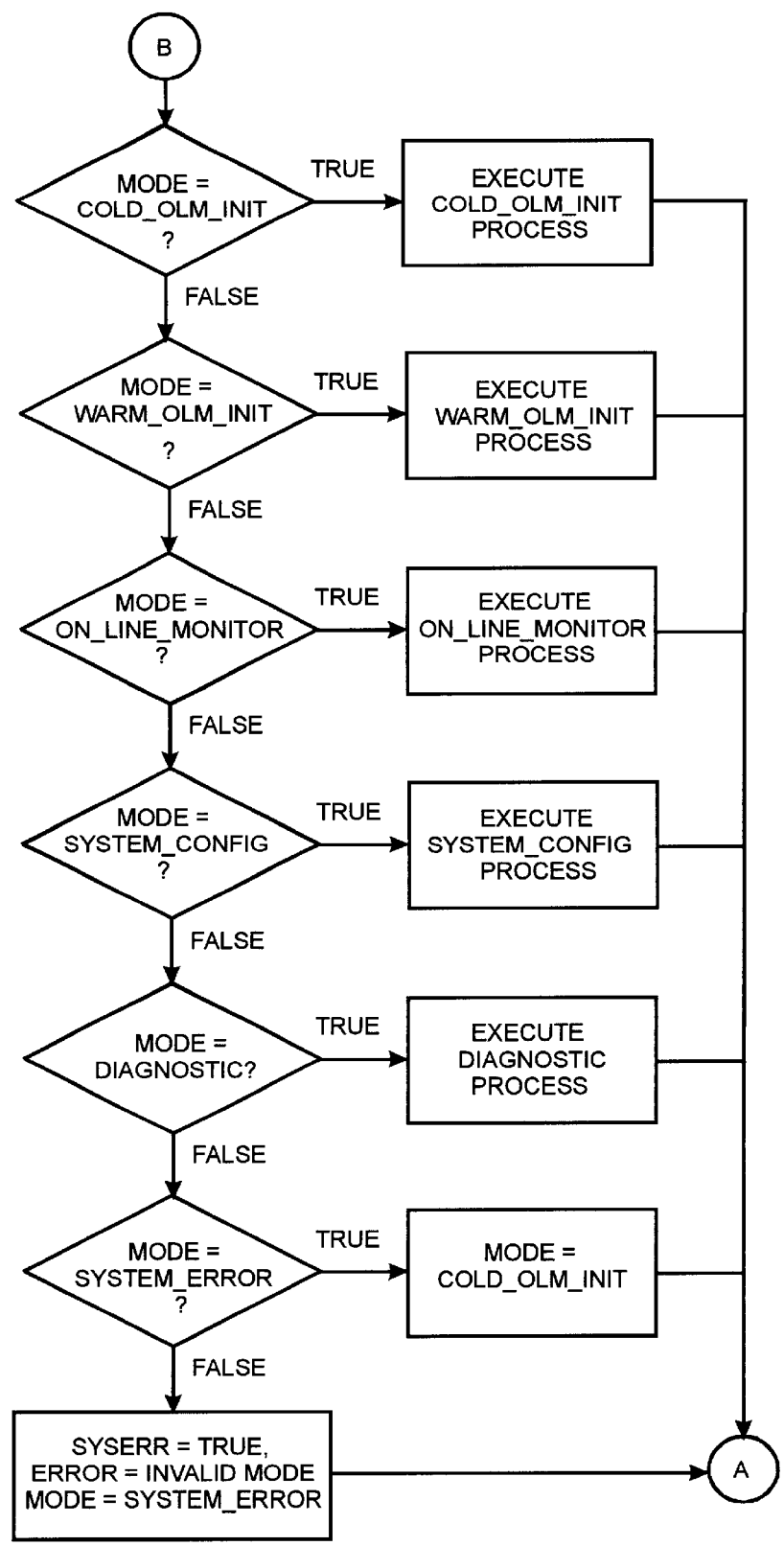

In the case where there is no system error detected, as indicated by the SYSERR flag set to the false state, the foreground process determines the state of the MODE variable and executes the corresponding process according to FIG. 15B. As can be seen from FIG. 15B, valid values for the MODE variable are:

COLD_OLM_INIT, which indicates initialization from a cold, or power-up, start or in response to a system reset caused by a command received via the fieldbus, WARM_online monitor _INIT, in which the foreground process readies the online monitor 10 to enter the monitor mode without a complete initialization.

ON_LINE_MONITOR, in which the online monitor 10 is actively monitoring and capturing data, SYSTEM_CONFIG, in which the online monitor 10 stops monitoring and capturing data, and the external equipment 40 can define or redefine the parametric values of events, the data capture mode, set the time of the real time clock 118, and perform other operations that would normally be associated with commissioning the device in readiness to perform its intended monitoring.

DIAGNOSTIC mode which contains all the features of the SYSTEM_CONFIG mode, but also allows external equipment 40 to explicitly write and read values to and from the DSP Base Unit EEPROM 84 and the EEPROM 122 contained on the DSP-ring 16. This mode is normally used only during the manufacturing process to facilitate calibration and initialization of the serial EEPROMs 84, 122.

SYSTEM_ERROR in which the online monitor 10 is awaiting commands from the external equipment 40 in order to perform an orderly recovery from a system error. These errors could be a corrupted on board EEPROM, or in a state in which the online monitor 10 cannot that recover, such as a corrupt DSP base EEPROM 84.

For each value above, a separate process is shown in FIG. 15B, except for the SYSTEM_ERROR process, in which case the foreground task simply sets the MODE to COLD_OLM_INIT and returns, and the default condition in which the SYSERR flag is set TRUE, the ERROR variable is set to INVALID MODE and the MODE is set to SYSTEM_ERROR. It should be noted that this last condition should never be encountered in actual operation but the tests and resulting actions have been included in the foreground task software for completeness.

Figure 15C:
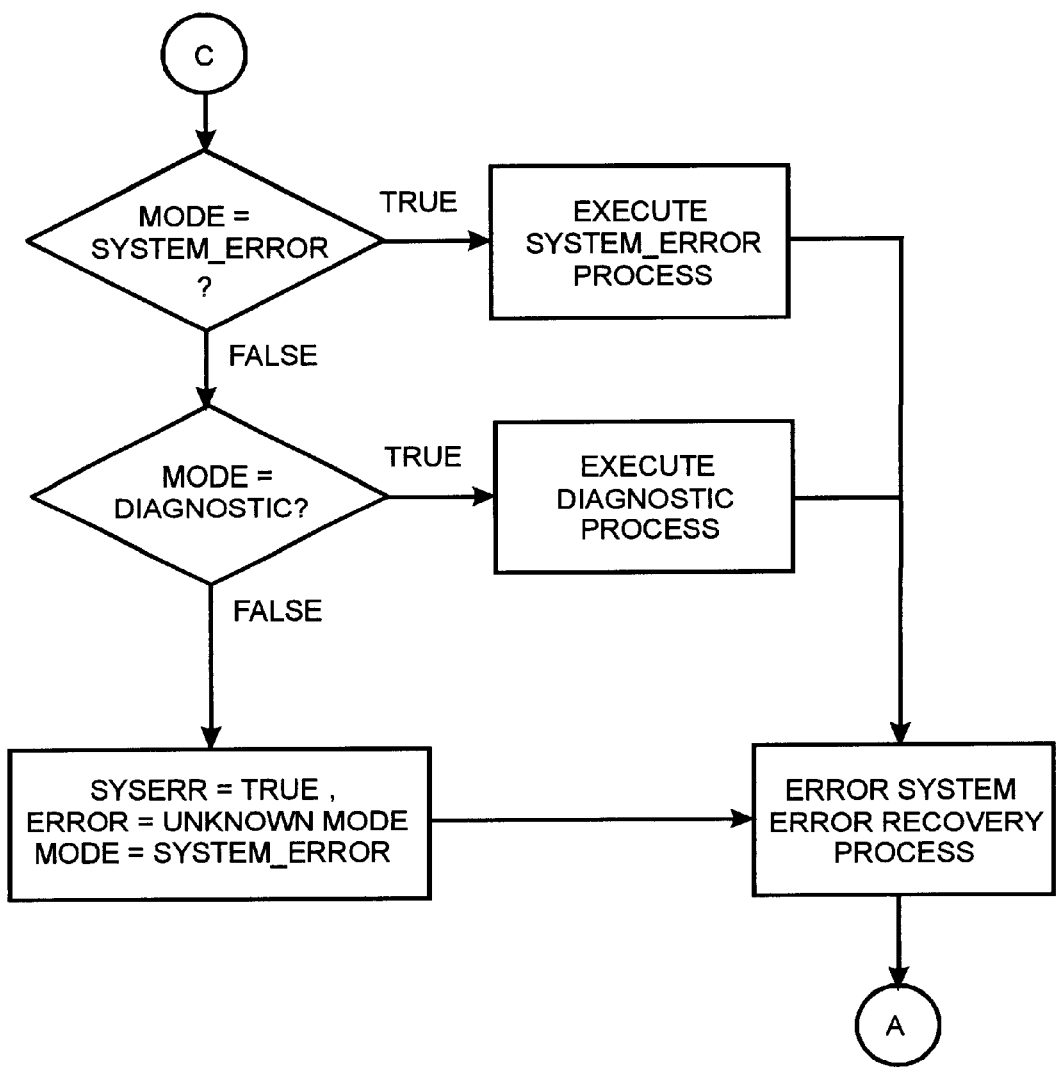
Figure 16:
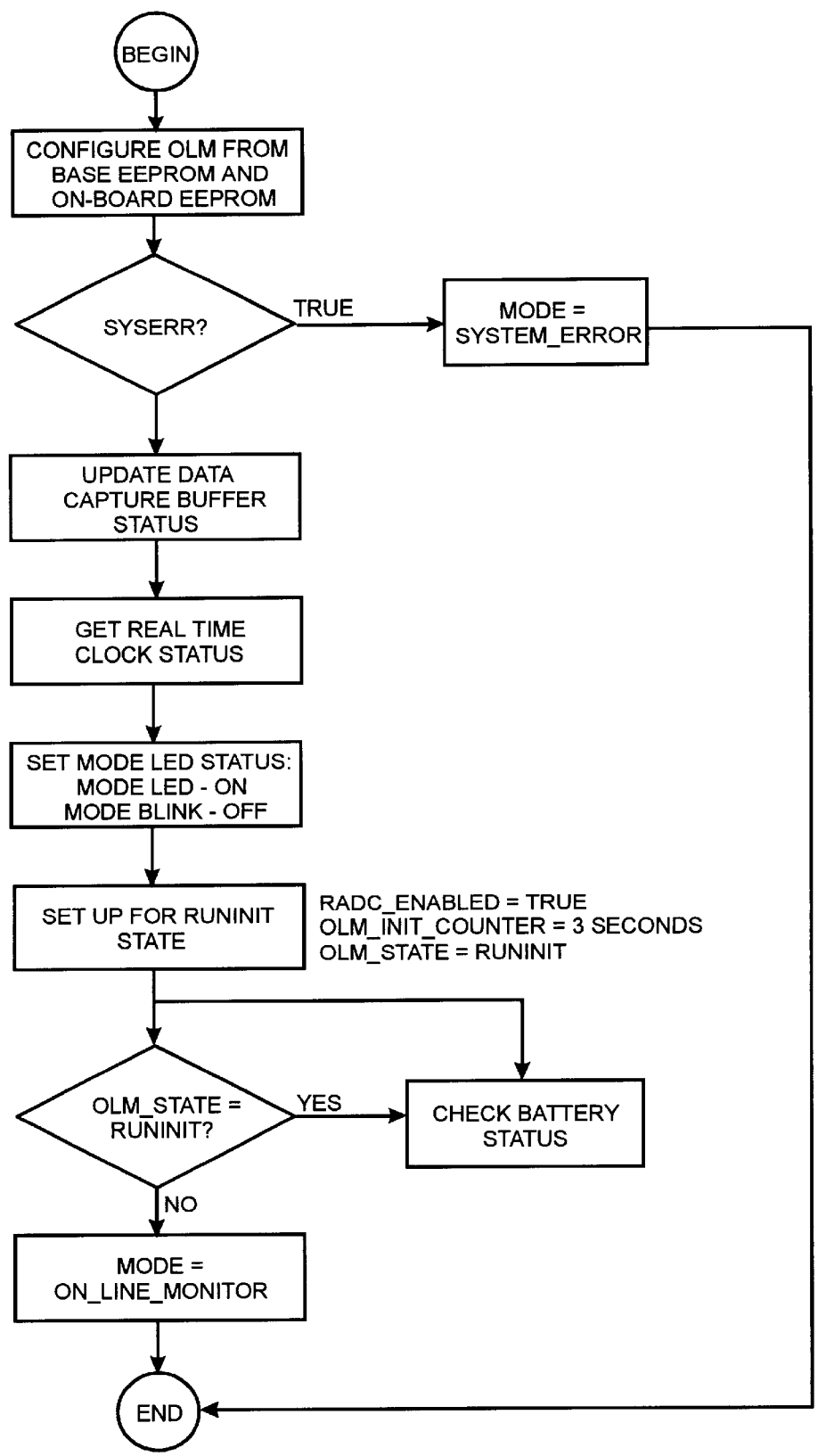
FIG. 16 is a flowchart illustrating initialization from a cold, or power-up, start or in response to a system reset in the online monitoring device according to the present invention.

FIG. 16 shows the COLD_OLM_INIT process that is executed when the detected MODE is COLD_OLM_INT in FIG. 15B. In this mode, the foreground task attempts to read the EEPROMs on both the DSP Base Unit and DSP ring 16. If a corrupt EEPROM is detected, the foreground task sets the SYSERR flag true, sets the MODE to SYSTEM_ERROR and returns to the main flowchart in FIG. 15, with no additional processing. Assuming no EEPROM errors are detected, the foreground task updates the data capture buffer status buffers and retrieves the real time clock status. It then sets the indicator LED states to turn the MODE LED to the on state, and turns the blinking feature of the MODE LED off. It then.sets up the background task to initialize the real analog data channels, RADC FIFO buffers and the trigger manager by setting the RADC_ENABLED flag true, setting the OLM_STATE state variable to RUNINIT and loading the OLM_INIT_COUNTER to allow initialization to proceed for 3 seconds. Since the COLD_OLM_INIT mode is entered in response to a power up condition, allowing such a long initialization period gives the external power supply that furnishes power to the online monitor 10 time to stabilize, avoiding nuisance events in some applications. Other values could be used for the initialization time without loss of generality.

Once the foreground task has enabled processing of the real analog data channels, has set up the initialization counter, and has set the OLM_STATE variable to RUNINIT, it waits for the background task to complete its initialization. While waiting, the foreground task reads the battery state. The background task then completes the initialization. The background task signifies completion of initialization by changing the value of the OLM_STATE variable from RUNINT to MONITOR. Once this has occurred, the foreground task changes the value of the MODE variable to ON_LINE_MONITOR and the COLD_OLM _INIT process is complete.

Figure 17:
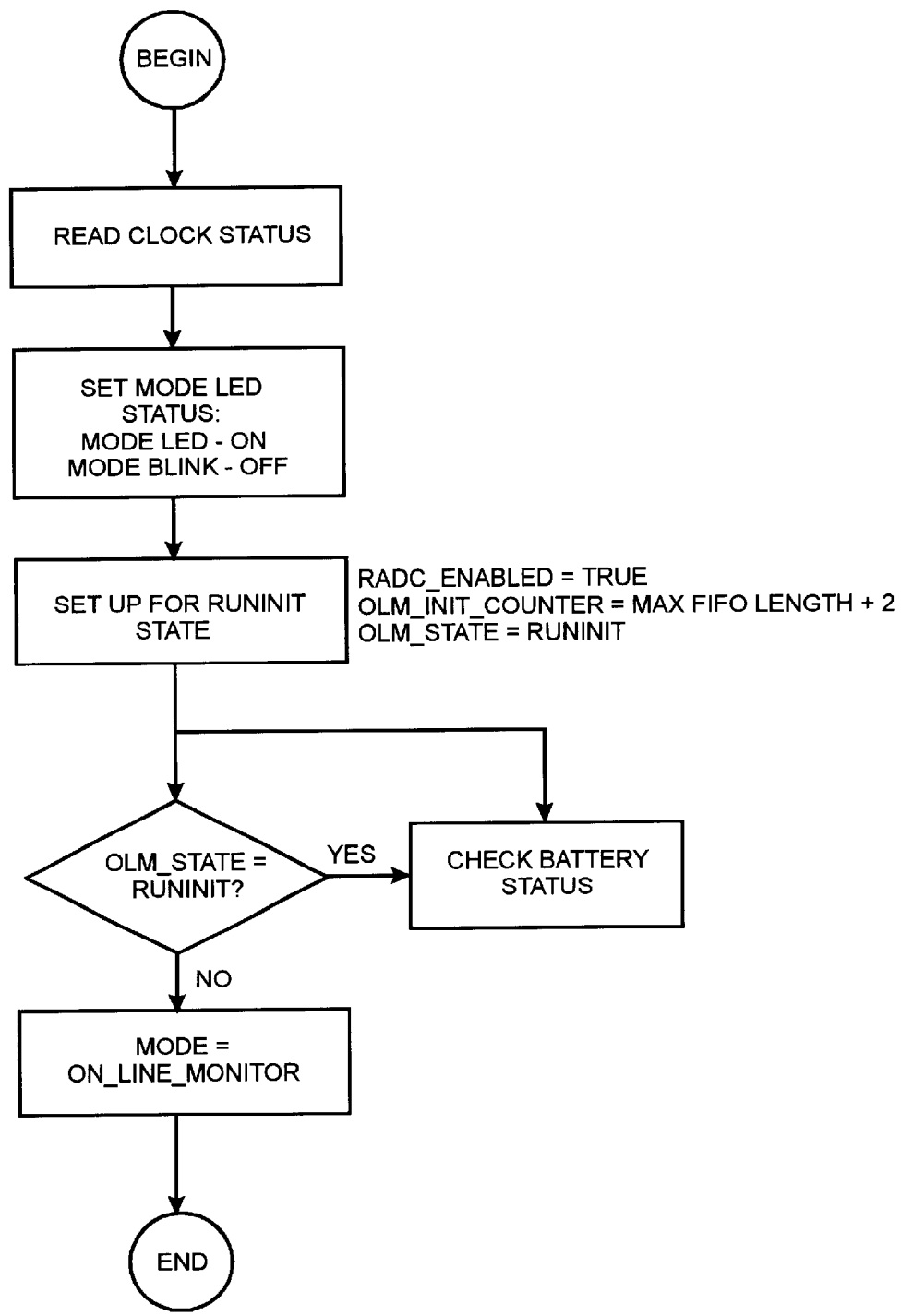
FIG. 17 is a flowchart detailing a transition from an initialization mode to an online monitoring mode for the online monitoring device according to the present invention.

FIG. 17 shows the WARM_OLM _INIT process that executes when the MODE variable is detected in the WARM_OLM_INIT state in FIG. 15B. This state facilitates the transition from the SYSTEM_CONFIG, DIAGNOSTIC or SYSTEM_ERROR state to the ON_LINE_ MONITOR state. The foreground task first reads the real time clock 118 status, then sets the MODE LED to the ON state and turns the MODE_BLINK feature off. It then sets up the background task to enter the RUNINIT state by enabling processing of the real analog data channels 30 by setting the RADC_ENABLED flag true. It then sets the OLM_INIT_COUNTER to the maximum length of an RADC FIFO, plus 2 additional elementary scans, to ensure that all state variable required to monitor and capture data are properly initialized, and by setting the OLM_STATE variable to RUNINIT. The foreground task then waits for the background task to change the OLM_STATE from RUNINIT, nominally to MONITOR, before proceeding. While the foreground task is waiting for this to occur, it continuously reads the battery status. Once the background task has exited the RUNINIT state, the foreground task changes the MODE to ON_LINE_MONITOR and the WARM_OLM_BOOT process is complete.

Figure 18:
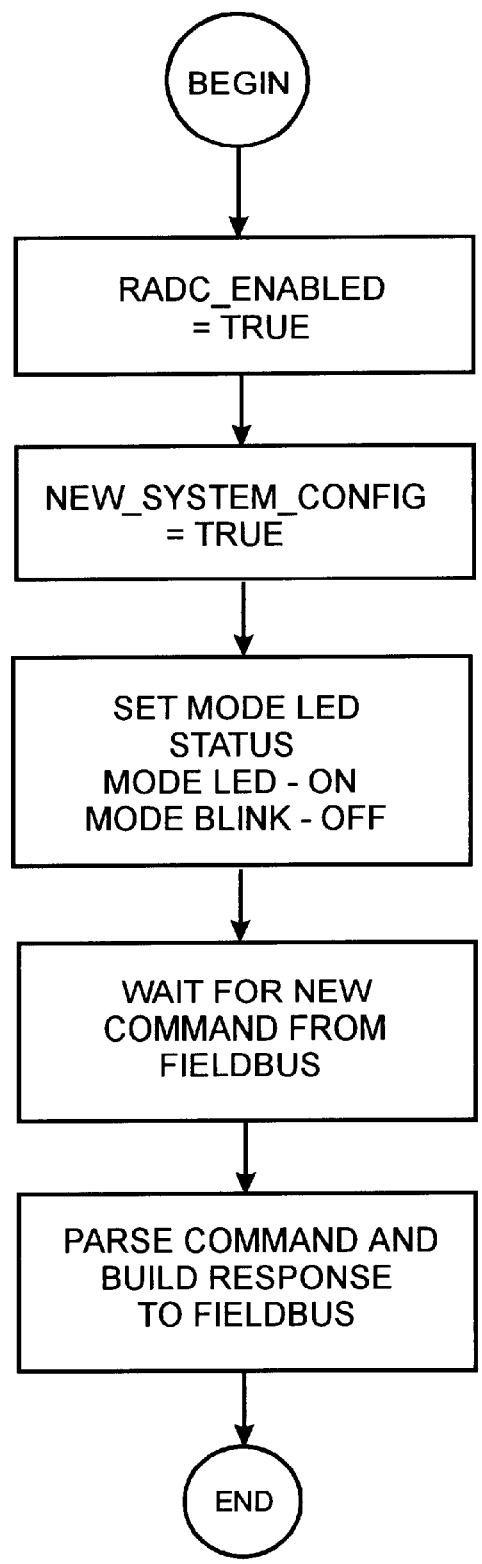
FIG. 18 is a flowchart illustrating operation of the online monitor when it is actively monitoring and capturing data according to the present invention.

FIG. 18 shows the ON_LINE_MONITOR process that executes when the MODE variable is detected in the ON_LINE_MONITOR mode in FIG. 15B. In this mode, the foreground task causes the background task to update the real analog data channels 30 by setting the RADC_ ENABLED flag to the true state. On each pass through the ON_LINE_MONITOR process, the foreground task sets a NEW_SYSTEM_CONFIG flag to the true state. This flag is used by the SYSTEM_CONFIG process in a manner to be described subsequently. The DSP 100 sets the MODE LED on and turns the MODE LED BLINK feature off. The solid MODE LED indicates to a user that the online monitor 10 is in the ON_LINE_MONITOR mode. The foreground task then waits for a new command to be received from the fieldbus 38, monitoring the battery while it waits. When a new command is received from the fieldbus 38, a parser routine is executed to interpret the command. The parser routine executed by the foreground task in the ON_LINE_ MONITOR process is capable of interpreting commands and detecting if a command received is valid in the ON_LINE_MONITOR mode. Assuming it is, the parser can also determine if the parametric values contained in the command are valid, and can modify registers, read data, etc. as determined by the command. Once the command is parsed and the appropriate action taken, a response is built by the foreground task and sent back to external equipment 40 via the fieldbus 38. Once this response has been built, the ON_LINE_MONITOR process is complete. There are no time restrictions placed on the time between commands which is the length of time required to respond to a message, since the foreground task can generally respond quickly relative to the speed of response of the fieldbus 38. The external equipment 40 can cause the foreground task to exit the ON_LINE_MONITOR mode by virtue of a command that explicitly sets the MODE variable.

Figure 19:
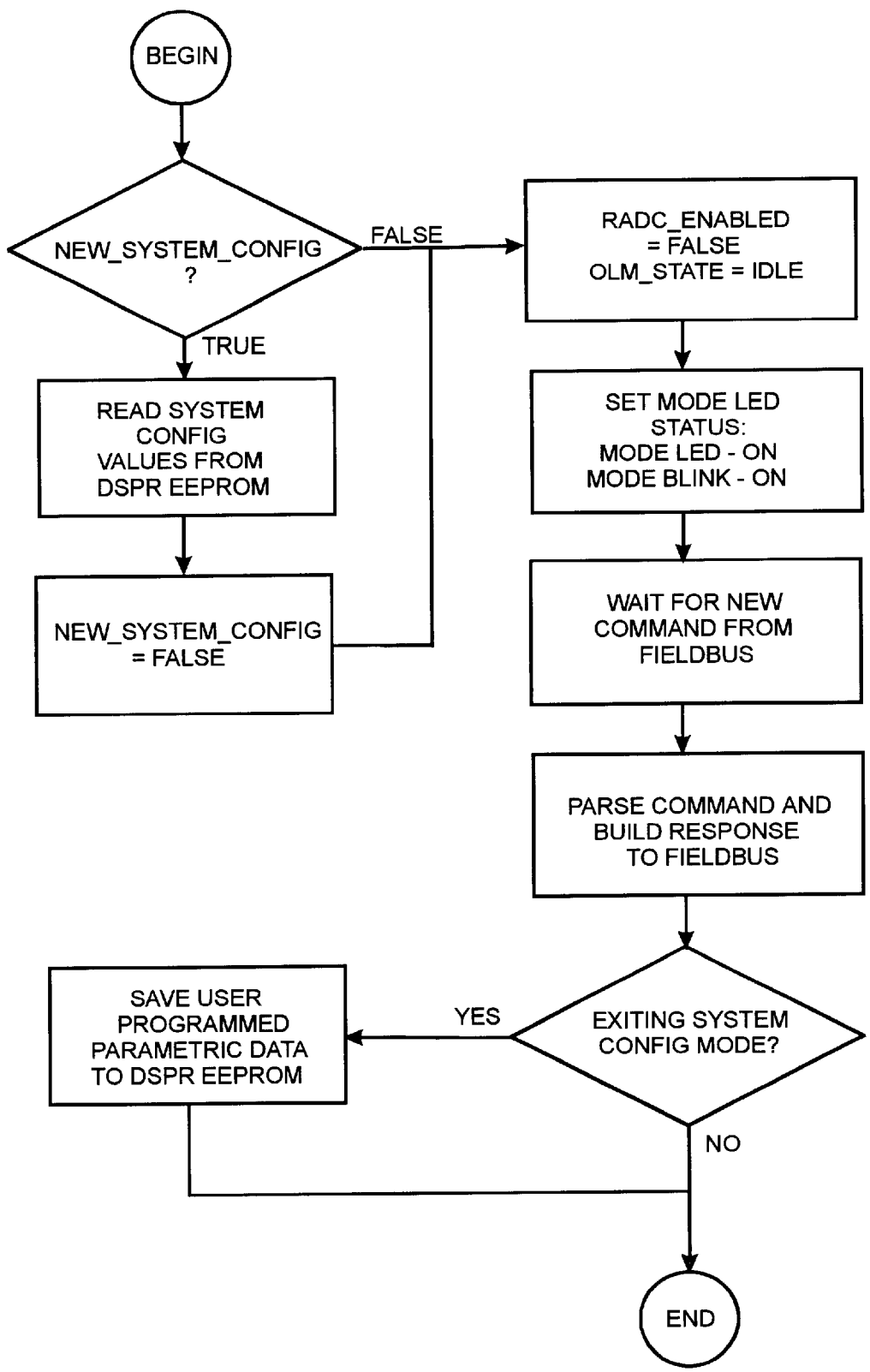
FIG. 19 is a flowchart illustrating a system configuration mode for the online monitor according to the present invention.

FIG. 19 shows the SYSTEM_CONFIG process that executes when the MODE variable is detected in the SYSTEM_CONFIG state in FIG. 15B. The foreground task first tests the value of the NEW_SYSTEM_CONFIG flag. This flag is set to the true state in the ON_LINE_ MONITOR process, and is also set true by the DIAGNOSTIC and SYSTEM_ERROR processes to be described subsequently. If the NEW_SYSTEM_CONFIG flag is set true, it is an indication that the MODE variable has just been changed to SYSTEM_CONFIG. The foreground task then reads the system configuration variables from the EEPROM on the DSP ring 16 prior to setting the NEW_SYSTEM_ CONFIG flag false. In the SYSTEM_CONFIG mode, the online monitor 10 is not monitoring or capturing data. The foreground task turns these functions off by setting the RADC_ENABLED flag to the false state and by setting the online monitor _STATE variable to IDLE. The SYSTEM_ CONFIG state is indicated on the online monitor 10 LED indicators by a flashing MODE led. Once the foreground task sets the LED states to indicate SYSTEM_CONFIG mode, the foreground task waits for a new command to be received by external equipment via the fieldbus 38. When a new command is received, it is parsed by a routine that knows which commands are valid in the SYSTEM_ CONFIG mode. The routine is capable of determining whether the parametric data associated with a command is valid and can read or write the data as appropriate. When the command has been parsed and all associated activities are complete, the foreground task builds a response to be returned to external equipment via the fieldbus.

There are commands that cause the foreground task to exit the SYSTEM_CONFIG mode. When the foreground task detects that it is exiting the SYSTEM_CONFIG mode, all user programmed parametric data is written to the EEPROM on the DSP ring 16, so it can be saved. Once the data is written to the EEPROM, the SYSTEM_CONFIG process is complete.

Figure 20:
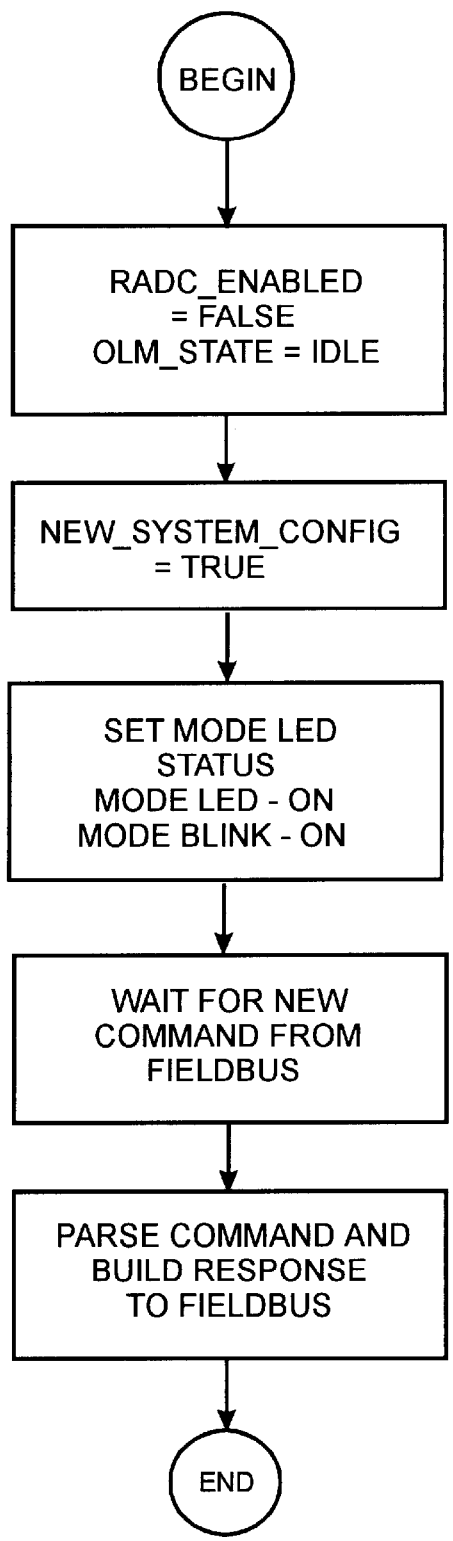
FIG. 20 is a flowchart illustrating operation of the online monitor when it is in a diagnostic mode according to the present invention.

FIG. 20 shows the DIAGNOSTIC process that executes when the MODE variable is detected in the DIAGNOSTIC state in FIG. 15B or FIG. 15C. The DIAGNOSTIC mode is not a mode that the end user of the system would normally invoke and in fact it takes a sequence of commands properly specified and in proper order to enable the DIAGNOSTIC mode. Once the DIAGNOSTIC process begins execution, it first disables the processing of the analog signals, triggers and data capture in the background task by setting the RADC_ENABLED flag false and the online monitor _STATE to the idle state. The foreground task then sets the NEW_SYSTEM_CONFIG flag used by the SYSTEM_CONFIG process described above to a TRUE state and sets the LED indicators to the same condition as the SYSTEM_CONFIG mode. The foreground task then waits for a new command from the field bus 38 and parses the command using a parser that understands the commands and parametric data that are valid in the DIAGNOSTIC mode. It then performs the appropriate actions based on the command received, and builds a response to be returned to external equipment 40 via the fieldbus 38. Once this has been accomplished, the DIAGNOSTIC process is complete.

Figure 21:
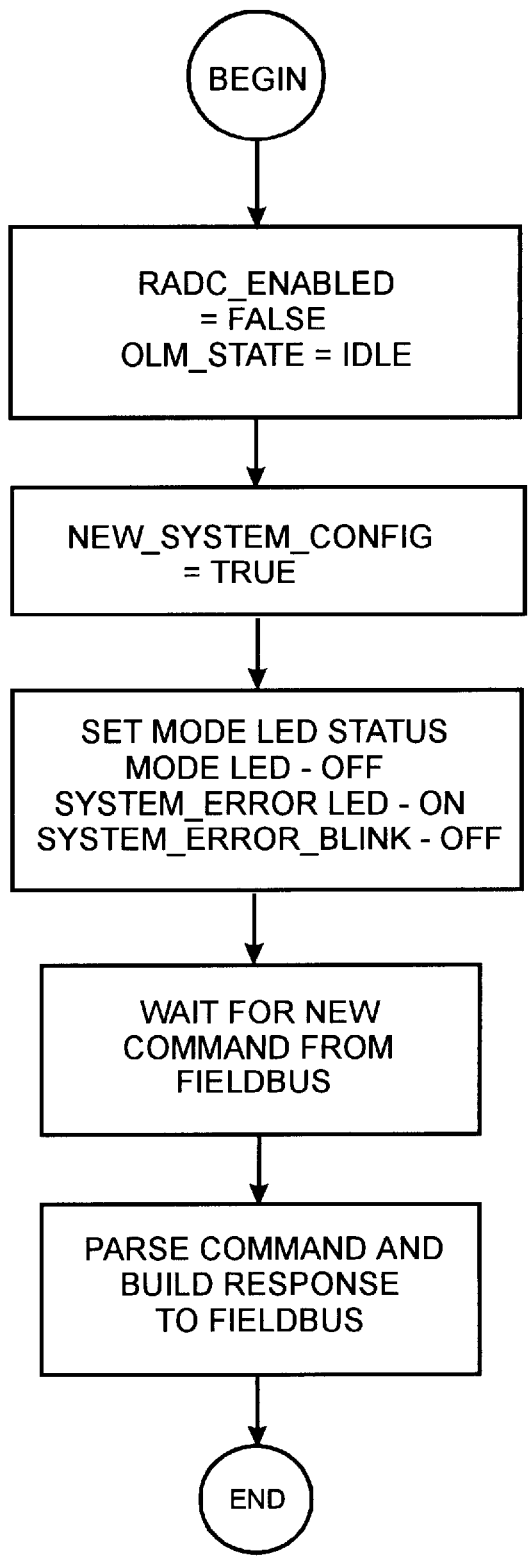
FIG. 21 is a flow chart illustrating operation of the online monitor when it is in a system error state according to the present invention.

If, in FIG. 15A, the SYSERR flag is detected in the true state, the subsequent processing follows the flowchart of FIG. 15C. When the SYSERR flag is true, only two values of the MODE variable are recognized, a SYSTEM_ERROR and a DIAGNOSTIC. If the MODE variable is SYSTEM_ERROR with the SYSERR flag set true, a SYSTEM ERROR process as described in FIG. 21 is executed. Processing of analog signals, and monitoring and capturing of data is not allowed in the SYSTEM_ERROR mode. To disable this, the SYSTEM_ERROR process sets the RADC_ENABLED flag false and the online monitor _STATE variable to IDLE. It then sets the NEW_SYSTEM_CONFIG flag, used by the SYSTEM_CONFIG process described above to a true state. The SYSTEM_ERROR state is indicated by the absence of the MODE LED and by a solid SYSTEM_ERROR LED, independent of the battery condition. The SYSTEM_ERROR LED blinks when the online monitor 10 is not in the SYSTEM_ERROR mode and a battery low condition is detected. The foreground task then waits for a new command from the field bus and parses the command using a parser that understands the commands and parametric data that are valid in the SYSTEM_ERROR mode. It then performs the appropriate actions based on the command received, and builds a response to be returned to external equipment 40 via the fieldbus 38. Once this has been accomplished, the SYSTEM_ERROR process is complete.

Referring back to FIG. 15C, if the MODE variable is set to DIAGNOSTIC, the DIAGNOSTIC process is executed as described above. If the MODE variable is not set to either the SYSTEM_ERROR or DIAGNOSTIC state, the foreground task sets the SYSERR flag true, sets the ERROR state to INVALID MODE and sets the mode to SYSTEM_ERROR. In theory, this condition cannot occur, but the logic incorporated in the foreground task as described for completeness.

After the appropriate process (SYSTEM_ERROR or DIAGNOSTIC) is executed as described above, the foreground task then executes the SYSTEM ERROR RECOVERY process. Some detected system errors do not use an automatic procedure. For example, if the DSP Base Unit 14 EEPROM is corrupt, the base must be repaired and re-calibrated. In this case, the foreground task does not allow recovery without re-booting the system, which can be done via the fieldbus 38 using the RESET command, or by cycling power to the online monitor 10. However, other errors, such as a corrupt EEPROM on the DSP ring 16 can be initialized to a known state in preparation for re-commissioning. In this particular case, once the external equipment 40 acknowledges the error, by issuing a READ SYSTEM ERROR command, the foreground task will initialize the EEPROM on the DSP ring 16 to a known value and sets the ERROR to "ON BOARD EEPROM INITIALIZED." Once the external equipment 40 acknowledges this error, again by issuing a READ SYSTEM ERROR command, the foreground task clears the SYSERR flag and allow the online monitor 10 to operate normally. Other system errors have similar recovery procedures.

While the specific embodiments have been illustrated and described, numerous modifications are possible without departing from the scope or spirit of the invention. The above description refers to a circuit breaker controller application. However, the principles described are readily applicable to any type of control system using an online monitoring control, including motor controls such as AC or DC drives, inverters, power supplies, and the like.

We claim:

1. A monitoring control device coupled to a system, the monitoring control device comprising:
    a Base Unit for receiving a plurality of analog signals from a respective plurality of analog channels and conditioning the received analog signals by a set of predetermined parameters;
    a digital signal processor coupled to the Base Unit for receiving the plurality of conditioned analog signals and converting each conditioned analog signal to a respective digital signal, wherein the digital signal processor compares the instantaneous value of each digital signal to a plurality of trigger conditions and initiates a data capture of a subset of data of the analog channels over a time window in response to at least one of the plurality of trigger conditions being satisfied, wherein the identity of the subset corresponds to the identity of the trigger condition;
    a non-volatile memory coupled to the digital signal processor for real-time storage of the subset of data captured by the digital signal processor;
    a field bus communications adapter coupled to the digital signal processor for providing access to the non-volatile memory wherein the digital signal processor utilizes a command set protocol for providing access to non-volatile memory; and
    a field bus network of external devices coupled to the field bus communications adapter for accessing the subset of data stored in the non-volatile memory wherein the field bus network of external devices further provides parameters for defining the plurality of trigger conditions.

2. The monitoring control device of claim 1 wherein the Base Unit comprises a self-contained power supply for generating a plurality of voltage signals for converting the conditioned analog signals to digital signals.

3. The monitoring control device of claim 2, wherein the self-contained power supply derives power from at least one of the plurality of analog channels.

4. The monitoring control device of claim 1, wherein the digital signal processor utilizes a fixed sample rate to convert each conditioned analog signal to the respective digital signal.

5. The monitoring control device of claim 1 wherein the Base Unit and digital signal processor provide a galvanic isolation between the analog signals and the field bus communication adapter.

6. The monitoring control device of claim 1 wherein the parameters for defining the plurality of trigger conditions are stored in the non-volatile memory.

7. The monitoring control device of claim 1 wherein the digital signal processor further comprises an event clock for creating a time stamp identifying a time a trigger condition occurs, wherein the time stamp and the corresponding trigger event is stored in the non-volatile memory.

8. The monitoring control device of claim 7, wherein an external time source synchronizes the event clock at periodic time intervals.

9. The monitoring control device of claim 8, wherein an externally supplied electronic pulse synchronizes the event clock.

10. The monitoring control device of claim 8, wherein the external synchronizing time source is a global positioning system.

11. The monitoring control device of claim 1 wherein the trigger condition comprises a logical comparison of a first parametrically designated analog channel to a time varying threshold derived as a function of a second parametrically designated analog channel.

12. The monitoring control device of claim 11, wherein the time varying threshold function is a percentage of the second parametrically designated analog channel.

13. The monitoring control device of claim 11, wherein the time varying threshold is a fixed constant added to the instantaneous value of the second parametrically designated analog channel.

14. The monitoring control device of claim 1 wherein the trigger condition comprises a logical comparison of an absolute value of a first parametrically designated analog channel to a time varying threshold derived as an absolute value of a function of a second parametrically designated analog channel.

15. The monitoring control device of claim 14, wherein the time varying threshold is derived as the absolute value of a percentage of the second parametrically designated analog channel.

16. The monitoring control device of claims 14, wherein the time varying threshold is derived by adding a fixed constant to the absolute value of a fixed constant added to the instantaneous value of the second parametrically designated analog channel.

17. A method of monitoring control device coupled to a system, the method comprising:

receiving a plurality of analog signals from a respective plurality of analog channels;

conditioning the received analog signals by a set of predetermined parameters;

converting each conditioned analog signal to a respective digital signal;

comparing the instantaneous value of each digital signal to a plurality of trigger conditions wherein a data capture of a subset of data of the analog channels is initiated over a time window in response to at least one of the plurality of trigger conditions being satisfied, wherein the identity of the subset corresponds to the identity of the trigger condition;

storing the subset of data captured in real-time in a non-volatile memory; and providing access to the non-volatile memory for accessing the subset of data captured and for storing parameters for defining the plurality of trigger conditions wherein a command set protocol is utilized for accessing the non-volatile memory.

18. The method of claim 17, further comprising a step of generating a plurality of voltage signals for converting the conditioned analog signals to the respective digital signal.

19. The method of claim 17, further comprising a step of creating a time stamp identifying a time a trigger occurs.

20. The method of claim 19, further comprising a step of storing the time stamp and the corresponding trigger event in the non-volatile memory.

21. The method of claim 17, wherein the trigger condition comprises a logical comparison of a first analog signal to a time varying threshold derived as a function of a second analog signal.

22. The method of claim 21, wherein the time varying threshold is a percentage of the second analog signal.

23. The method of claim 21, wherein the time varying threshold is a fixed constant added to the instantaneous value of the second analog signal.

24. The method of claim 17, wherein the trigger condition comprises a logical comparison of an absolute value of a first analog signal to a time varying threshold derived as an absolute value of a function of a second analog signal.

25. The method of claim 24, wherein the time varying threshold is derived as the absolute value of a percentage of the second analog signal.

26. The method of claim 24, wherein the time varying threshold is the absolute value of a fixed constant added to the instantaneous value of the second analog signal.

* * * * *